(12) United States Patent
Bent et al.

(10) Patent No.: US 7,509,286 B1
(45) Date of Patent: Mar. 24, 2009

(54) SYSTEMS AND METHODS FOR MONEY FUND BANKING WITH FLEXIBLE INTEREST ALLOCATION

(75) Inventors: Bruce Bent, New York, NY (US); Bruce Bent, II, New York, NY (US)

(73) Assignee: Reserve Management Corporation, New York, NY (US)

( * ) Notice: Subject to any disclaimer, the term of this patent is extended or adjusted under 35 U.S.C. 154(b) by 1368 days.

(21) Appl. No.: 10/411,650

(22) Filed: Apr. 11, 2003

Related U.S. Application Data

(63) Continuation-in-part of application No. 10/382,946, filed on Mar. 6, 2003, and a continuation-in-part of application No. 10/071,053, filed on Feb. 8, 2002, and a continuation-in-part of application No. 09/677,535, filed on Oct. 2, 2000, which is a continuation-in-part of application No. 09/176,340, filed on Oct. 21, 1998, now Pat. No. 6,374,231.

(60) Provisional application No. 60/372,374, filed on Apr. 12, 2002.

(51) Int. Cl.
*G06Q 40/00* (2006.01)
(52) U.S. Cl. .............................. 705/39; 705/35; 705/38
(58) Field of Classification Search ................... 705/39, 705/35
See application file for complete search history.

(56) References Cited

U.S. PATENT DOCUMENTS 4,232,367 A 11/1980 Youden et al.
4,346,442 A 8/1982 Musmanno
4,376,978 A 3/1983 Musmanno
4,597,046 A 6/1986 Musmanno (Continued)

FOREIGN PATENT DOCUMENTS

JP 10049590 2/1998

(Continued)

OTHER PUBLICATIONS

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

(Continued)

*Primary Examiner*—Jagdish N Patel
(74) *Attorney, Agent, or Firm*—Foley & Lardner LLP

(57) ABSTRACT

This invention provides system and methods for managing accounts of clients at customer financial entities so that deposits of up to $100,000 or greater are insured, so that interest income earned on a portion of all of the account balances may be flexibly allocated according to customer instructions, and so that withdrawals are not limited. These objects are satisfied by holding client funds at interest-earning money market deposit accounts at one or more banks of savings institutions. More particularly, this invention provides methods for receiving client transaction information, determining a net transfer of funds into or out of each client account from transaction information, causing transfer of funds from the insured, interest-bearing deposit accounts to match the net transfer of funds into or out of each client account, and allocating interest earned by the deposit accounts to clients according to customer instructions. This invention also provides systems and software products implementing these methods.

18 Claims, 5 Drawing Sheets

U.S. PATENT DOCUMENTS

| | | | |
|---|---|---|---|
| 4,674,044 A | 6/1987 | Kalmus | |
| 4,694,397 A | 9/1987 | Grant | |
| 4,700,297 A | 10/1987 | Hagel | |
| 4,751,640 A | 6/1988 | Lucas et al. | |
| 4,774,663 A | 9/1988 | Musmanno | |
| 4,953,085 A | 8/1990 | Atkins | |
| 4,985,833 A * | 1/1991 | Oncken | 705/42 |
| 5,126,936 A | 6/1992 | Vitagliano | |
| 5,206,803 A | 4/1993 | Vitagliano | |
| 5,235,507 A | 8/1993 | Sackler | |
| 5,262,942 A | 11/1993 | Earled | |
| 5,270,922 A | 12/1993 | Higginsg | |
| 5,291,398 A | 3/1994 | Hagan | |
| 5,297,032 A | 3/1994 | Trojand | |
| 5,424,938 A | 6/1995 | Wagner et al. | |
| 5,631,828 A | 5/1997 | Hagan | |
| 5,671,363 A | 9/1997 | Christofich | |
| 5,689,650 A | 11/1997 | McClelland | |
| 5,710,889 A | 1/1998 | Clark | |
| 5,765,144 A | 6/1998 | Larche | |
| 5,774,880 A | 6/1998 | Ginsberg | |
| 5,781,654 A | 7/1998 | Carney | |
| 5,806,048 A | 9/1998 | Kiron et al. | |
| 5,806,049 A | 9/1998 | Petruzzi | |
| 5,812,987 A | 9/1998 | Luskin | |
| 5,826,243 A | 10/1998 | Musmanno | |
| 5,852,811 A | 12/1998 | Atkins | |
| 5,864,685 A | 1/1999 | Hagan | |
| 5,878,258 A | 3/1999 | Pizia | |
| 5,878,405 A | 3/1999 | Grant et al. | |
| 5,890,141 A | 3/1999 | Carney | |
| 5,893,078 A | 4/1999 | Paulson | |
| 5,903,881 A | 5/1999 | Schrader et al. | |
| 5,905,974 A | 5/1999 | Fraser | |
| 5,940,809 A | 8/1999 | Musmanno | |
| 5,941,996 A | 8/1999 | Smith | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein | |
| 6,014,642 A | 1/2000 | El-Kadi et al. | |
| 6,016,482 A | 1/2000 | Molinari | |
| 6,026,438 A | 2/2000 | Piazza | |
| 6,041,314 A | 3/2000 | Davis | |
| 6,044,371 A | 3/2000 | Person | |
| 6,047,324 A | 4/2000 | Ford | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna | |
| 6,112,191 A | 8/2000 | Burke | |
| 6,131,810 A | 10/2000 | Weiss | |
| 6,154,770 A | 11/2000 | Kostakos | |
| 6,189,785 B1 | 2/2001 | Lowery | |
| 6,226,623 B1 | 5/2001 | Schein et al. | |
| 6,374,231 B1 | 4/2002 | Bent et al. | |
| 7,103,556 B2 | 9/2006 | Del Rey et al. | |
| 7,133,840 B1 | 11/2006 | Kenna | |
| 7,206,761 B2 | 4/2007 | Colvin | |
| 7,216,100 B2 | 5/2007 | Elliott | |
| 7,376,606 B2 | 5/2008 | Jacobsen | |
| 2001/0032182 A1 | 10/2001 | Kumar et al. | |
| 2002/0007330 A1 | 1/2002 | Kumar et al. | |
| 2002/0069147 A1 | 6/2002 | Sheehan et al. | |
| 2002/0091637 A1 | 7/2002 | Bent et al. | |
| 2002/0128951 A1 | 9/2002 | Kiron et al. | |
| 2002/0161707 A1 | 10/2002 | Cole et al. | |
| 2002/0165757 A1 | 11/2002 | Lisser | |
| 2002/0178098 A1 | 11/2002 | Beard | |
| 2003/0023529 A1 | 1/2003 | Jacobsen | |
| 2003/0135437 A1 | 7/2003 | Jacobsen | |
| 2003/0149646 A1 | 8/2003 | Chen et al. | |
| 2003/0177092 A1 | 9/2003 | Paglin | |
| 2003/0191702 A1 | 10/2003 | Hurley | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper et al. | |
| 2004/0162773 A1 | 8/2004 | Del Rey et al. | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1 | 5/2005 | Bent et al. | |
| 2005/0114246 A1 | 5/2005 | Coloma | |
| 2005/0154662 A1 | 7/2005 | Langenwalter | |
| 2005/0228733 A1 | 10/2005 | Bent et al. | |
| 2006/0106703 A1 | 5/2006 | Del Rey et al. | |
| 2006/0155644 A1 | 7/2006 | Reid et al. | |
| 2006/0167773 A1 | 7/2006 | Yang et al. | |
| 2006/0273152 A1 | 12/2006 | Fields | |
| 2007/0043666 A1 | 2/2007 | Burdette | |
| 2007/0255655 A1 | 11/2007 | Kemper et al. | |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1 | 2/2008 | Holm-Blagg et al. | |
| 2008/0065532 A1 | 3/2008 | De La Motte | |
| 2008/0097899 A1 | 4/2008 | Jackson et al. | |
| 2008/0133280 A1 | 6/2008 | Ziegler | |

FOREIGN PATENT DOCUMENTS

| | | |
|---|---|---|
| WO | WO 95/23379 | 8/1995 |
| WO | WO-99/18529 | 4/1999 |
| WO | WO-03/012580 | 2/2003 |
| WO | WO-2005/006111 | 1/2005 |

OTHER PUBLICATIONS

Bent, "Bruce Bent Makes Money Market Funds Act Like Bank Accounts," Equity BBDP, Oct. 5, 1998, 3 Sheets.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Britt, "Struggling with Sweep Accounts," America's Community Banker, vol. 6, No. 12, 11 Sheets, Dec. 1, 1997.

Chapelle, "Merrill's Rivals Say They, Too. Offer Services Beyond Banking," Securities Data Publishing On Wall Street, 2 Sheets, Feb. 1, 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Hoffman, "Reserve's FDIC-Insured Account Draws Regionals; But some see little need for insurance," Crain Communications Inc., Investment News, 2 Sheets, Jun. 4, 2001.

Keenan, "Tapping Brokerages for Alternative to CDs," American Banker, The Financial Services Daily, 3 Sheets, Feb. 18, 2004.

Lavine, "Check Out High-Yield Checking Accounts," Broward Daily Business Review, vol. 39, No. 102, 2 Sheets, Apr. 27, 1998.

McReynolds, "The Power of CASH: Ho-hum cash can be great product (and lead to more business) in troubled times," Securities Data Publishing on Wall Street, 3 Sheets, Jun. 1, 2002.

McReynolds et al. "Unusual Products for Unusual Times," Securities Data Publishing on Wall Street, 6 Sheets, May 1, 2001.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

Share, "New Service Skirts FDIC's $100K Limit," Dialog Web Command Mode, 2 Sheets, Jun. 13, 2003, http://www.dialogweb.com/cgi/dwclient.

Smith, "IBAA Won't Push Interest-Bearing Checking For Business; Says Too Few Members Want It," The American Banker, 2 Sheets, Apr. 18, 1996.

Stafford, "New Bank Program Allows $1 Million in Insured Deposits," Dialog Web Command Mode, 3 Sheets, Aug. 24, 2003, http://www.dialogweb.com/cgi/dwclient.

Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.

"Man Bites Dog: Funds Move Into Banking," IBC's Money Fund Selector, 2 Sheets, Nov. 6, 1998.

About iMoneyNet, Inc., About iMoneyNet's Money Funds Division, 4 Sheets, Aug. 21, 2003, http://www.ibcdata.com/about.htm.

"Reverse Ups Insurance Limit On Money Market Account," Thomson Financial Inc., Mutual Fund Market News, 1 Sheet, Aug. 26, 2002.

"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.

The Reserve Fund, Study of U.S. Patent No. 6,374,231, 1 Sheet.

"Bank of Oak Ridge to Offer FDIC Insurance on up to $1.5 Million," Dialog Web Command Mode, 2 Sheets, Sep. 25, 2003, http://www.dialogweb.com/cgi/dwclient.

Reserve Management Corporation, Reserve Insured Deposits, U.S. Appl. No. 76/315,600, Issued.

The Reserve, "What Sets Us Apart," 2 Sheets, Oct. 4, 2006, http://www.ther.com/bank/bank_wsua.shtml.

The Reserve, "Reserve Insured Deposits," 2 Sheets, Oct. 4, 2006, http://www.ther.com/ps/ps_fif.shtml.

The Reserve, "Company History," 3 Sheets, Oct. 4, 2006, http://www.ther.com/aboutus/history.shtml.

The Reserve, "Reserve Insured Deposits Program," 2 Sheets, Oct. 4, 2006, http://www.ther.com/bank/bank_insdep.shtml.

Reserve Insured Deposits, United States Patent and Trademark Office, Reg. No. 2,694,910, Registered Mar. 11, 2003, 1 Sheet.

Mutual Funds Magazine, Bargain Basement Funds, Oct. 1997, 2 Sheets.

Mutual Funds Magazine, Bargain Basement Funds, Oct. 1997, 1 Sheet.

Money Fund Report, IBC Financial Data, Inc., Nov. 6, 1998, 1 Sheet.

Liberman et al., Market Watch, "How Important are Banks?" FDIC Insurance on Deposits Just One Continuing Advantage, Oct. 17, 2006, 3 Sheets.

Declaration of Mr. Bruce Bent II, Vice Chairman and Registrant of Applicant. (3 Sheets) and Exhibits A, B, C and D (6 Sheets).

U.S. Appl. No. 10/825,440, filed Apr. 14, 2004, Bent et al.

Announcing Changes in Automatic "Sweep" Investment Options, LPL Financial Services, Linsco/Private Ledger, Member NASD/SIPC, 26 Sheets.

Insured Cash Account Program Disclosure Booklet, LPL Financial Services, Linsco/Private Ledger, Member NASD/SIPC, 14 Sheets.

California Independent Bankers, ICBA Independent Community Bankers of America, Banker Bulletin, 2006, CIB 16th Annual Convention, vol. 4, Issue 6, http://www.cib.org/banker_bulletin.htm, 2 Sheets.

AB 2011 Assembly Bill—Chaptered, http://www.leginfo.ca.gov/pub/bill/asm/ab_2001-2050/ab_2011_bill_20060925_chaptered.html, 2006, pp. 1-3.

AB 2011 Assembly Bill—Enrolled, http://www.leginfo.ca.gov/pub/bill/asm/ab_2001-2050/ab_2011_bill_20060816_enrolled.html, 2006, pp. 1-3.

AB 2011 Assembly Bill—History, Complete Bill History, http://www.leginfo.ca.gov/pub/bill/asm/ab_2001-2050/ab_2011_bill_20060925_history.html, 2006, p. 1.

AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.

AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

The Reserve Funds Press Release "The Reserve Funds and Frontier Bank Partner to Offer Revolutionary Banking Product," 5 Sheets, Aug. 1, 2000.

Online, www.usabancshares.com, >Brave New World, 1999, 2 Sheets.

ABA to Approve System for Sharing Deposit Coverage, American Banker (Feb. 11, 2003).

American Banker Online—New Pitch: Deposit Insurance Sharing, p. 1-4 (Jan. 21, 2003).

Blackwell, Rob, "New Pitch: Deposit Insurance Sharing", American Banker Online, Jan. 21, 2003.

Britt, Phil; "Struggling with Sweep Accounts,", American's Community Banker, Dec. 1997,v.6, n.12, p. 18-23.

Certificate of Deposit Registry Service: Keeping deposits in the corn patch; Banknews/Mar. 2003.

Heavyweight Funding, Bankers News, vol. II, Issue 5, p. 1-2 Mar. 4, 2003.

News article: "Regulators Support Demand Deposit Bill,", Regulatory Compliance Watch, Mar. 9, 1998; p. 1, vol. 9, No. 10.

Promontory Interfinancial Network; http://www.promnetwork.com/index.html (2003).

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.

The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.

FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

U.S. Appl. No. 60/307,815, filed Jul. 27, 2001.

U.S. Appl. No. 60/323,365, filed Sep. 20, 2001.

Letter From William W. Wiles, Secretary of the Board, Board of Governors of the Federal Reserve System, Jun. 22, 1983, 6 Sheets.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Letter from Michael Bradfield, General Counsel, Board of Governors of the Federal Reserve System, Nov. 16, 1984, 4 Sheets.

Board of Governors of the Federal Reserve System, 1984 Fed. Res. Interp. Ltr. LEXIS 56, Nov. 16, 1984, 3 Sheets.

Letter From Oliver I. Ireland, Associate General Counsel, Board of Governors of the Federal Reserve System, Jun. 22, 1988, 5 Sheets.

Board of Governors of the Federal Reserve System, 1988 Fed. Res. Interp. Ltr. LEXIS 141, Jun. 22, 1988, 3 Sheets.

Board of Governors of the Federal Reserve System, 1989 Fed. Res. Interp. Ltr. LEXIS 77, Mar. 14, 1989, 2 Sheets.

Board of Governors of the Federal Reserve System, 1989 Fed. Res. Interp. Ltr. LEXIS 154, Jun. 21, 1989, 2 Sheets.

Board of Governors of the Federal Reserve System, 1990 Fed. Res. Interp. Ltr. LEXIS 94, Feb. 1, 1990, 1 Sheet.

Board of Governors of the Federal Reserve System, 1991 Fed. Res. Interp. Ltr. LEXIS 232, Jan. 30, 1991, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

Board of Governors of the Federal Reserve System, 1994 Fed. Res. Interp. Ltr. LEXIS 156, Jun. 24, 1994, 3 Sheets.

CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. LEXIS 314, Oct. 17, 1994, 2 Sheets.

Board of Governors of the Federal Reserve System, 1994 Fed. Res. Interp. Ltr. LEXIS 419, Oct. 14, 1994, 4 Sheets.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_servi, Jan. 19, 2001, 4 Sheets.

Letter To Mr. Jonathan L. Levin, Esq., From Oliver Ireland, Associate General Counsel, Oct. 18, 1996, 2 Sheets.

Letter To Mr. L.P. Fleming, Jr., Esq., From Oliver Ireland, Associate General Counsel, Feb. 7, 1995, 3 Sheets.

Letter to Mr. James E. Creekman, Group Vice President, From Oliver Ireland, Associate General Counsel, Aug. 1, 1995, 4 Sheets.

Letter To Ms. Brenda L. Skidmore, Senior Vice President, From Oliver Ireland, Associate General Counsel, Aug. 30, 1995, 4 Sheets.

Part: 2, Monetary Policy and Reserve Requirements, Subpart - Regulation D, Board Interpretations of Regulation D, Transaction Accounts - Linked to Time Deposits, vol. 1, Federal Reserve Regulatory Service, 2 Sheets.

* cited by examiner

SYSTEMS AND METHODS FOR MONEY FUND BANKING WITH FLEXIBLE INTEREST ALLOCATION

1. RELATED APPLICATIONS

This application is a continuation-in-part of patent applications: Ser. No. 09/677,535, filed on Oct. 2, 2000, Ser. No. 10/071,053, filed Feb. 8, 2002, and Ser. No. 10/382,946 filed Mar. 6, 2003 entitled SYSTEMS AND METHODS FOR PROVIDING ENHANCED ACCOUNT MANAGEMENT SERVICE FOR MULTIPLE BANKS; all these applications are continuations-in-part of patent application Ser. No. 09/176,340, filed on Oct. 21, 1998, now U.S. Pat. No. 6,374,231. This application claims the priority of Ser. No. 09/677,535, filed on Oct. 2, 2000, Ser. No. 10/071,053, filed Feb. 8, 2002, Ser. No. 10/382,946 filed Mar. 6, 2003 and provisional patent application 60/372,374, filed Apr. 12, 2002.

2. BACKGROUND OF THE INVENTION

2.1. Field of the Invention

It would be desirable if depositors and investors could obtain FDIC insured, interest-bearing accounts with interest rates that can be flexibly assigned, with an unlimited number of fund transfers per month, and with insurance that may exceed $100,000. However, account offerings in the United States ("US") are limited by statutes generally codified as Title 12 of the United States Code ("U.S.C.") (Banks and Banking). These statutes and accompanying regulatory scheme limit investors and depositors seeking investments and deposits having a lower risk profile to a rather limited selection of choices, all of which suffer inhibiting constraints.

2.2. Background Art

More specifically, 12 CFR 329.2 states that "no bank shall, directly or indirectly, by any device whatsoever, pay interest on any demand deposit." A "deposit" is any money placed into a checking account, savings account, Certificate of Deposit (CD), or the like. In a "demand" account, the owner can make an unlimited number of funds transfers to another account (having the same or a different owner), or to a third party, typically by bank drafts, checks, credit cards, and debit cards. In essence, an account in which a depositor has the ability to make at least six transfers will be deemed a demand account and no interest will be payable on the funds therein (unless the funds are held in a NOW account under 18 U.S.C.1832(a)). Therefore, owners of demand accounts are denied interest on their funds.

The rules governing insurance of deposits in institutions insured by the BIF and the SAIF are the same. In particular, according to 12 U.S.C. § 1821(a), the FDIC limits insurance coverage provided to the owners(s) of funds deposited in each insured institution to $100,000, and bases insurance coverage on the concept of ownership rights and capacities, that is, funds held in different ownership categories are insured separately from each other; and funds owned by the same entity but held in different accounts at the same financial entity are subsumed under the same insurance coverage.

One or more of these objects are satisfied by systems and methods structured according to a novel and creative combination of certain of financial-entity and bank regulations first noticed and assembled by the inventors. First, although accounts that require withdrawal notice are not demand accounts and therefore may earn interest, certain accounts not requiring withdrawal notice may still be deemed "savings accounts" and capable of earning interest. For example, an account that does not require withdrawal notice (but may so require at any time) is nevertheless a savings account if no more than six transfers and withdrawals are made monthly. In particular, 12 C.F.R. § 204.2(d)(1) (underlining added) states:

Therefore, the inventors have conceived and implemented arrangements whereby a single corporation, partnership, or other legal person (generally, "entity") acts as an agent of numerous individuals or other ownership interests (for example, joint ownership, ownership in trust (such as individual retirement accounts, and other legally established savings mechanisms), and so forth) to manage the funds of each ownership interest in the aggregate MMDAs in one or more Supporting financial entities so that each ownership interest's funds earn interest while remaining FDIC insured with insurance up to $100,000 per each participating Supporting banking financial entity. Further, each Supporting financial entity, such as a bank or a saving institution, holds a single MMDA that is paired with a single corresponding DDA in the same name so that each ownership interest's use of managed funds is not limited.

To accomplish these and other objectives, this invention provides systems and methods for managing a plurality of Clients of one or more Customer financial entities by administering at one or more Supporting financial entities, such as banking or savings institutions, an FDIC-insured MMDA (money market deposit account) maintained at each participating Supporting financial entity in which are held some or all of the funds in the managed Client accounts, and for managing an Agent database recording the financial information describing the managed Client balances, Client information for each Client's account, Customer information for each Customer financial entity, financial information describing each aggregate MMDA held at a Supporting financial entity, and information for each Supporting financial entity. Where Client funds are held across more than one MMDA, the funds may be insured to more than $100,000. For example, if they are held in two (or three, or four) MMDAs (each MMDA held in a different Supporting financial entity), then insurance may be $200,000 (or $300,000, or $400,000).

In certain embodiments, where the Agent has a single MMDA-DDA pair in which all Agent-managed Client funds are held, Client liability insurance is limited to $100,000. In other embodiments, where it is preferable to provide Clients with more than $100,000 of insurance, the Agent has two or more MMDA-DDA pairs, each pair in a different Supporting financial entity, and it manages Client funds so that each Client's ownership interest at any one Supporting financial entity never exceeds $100,000. For example, when a Client's balance exceeds $90,000 (or some other operational threshold not greater than $100,000) in the aggregate MMDA at a particular Supporting financial entity, excess funds are automatically moved to a MMDA at a second Supporting financial entity. Although, Client funds may be from time-to-time be deposited at several Supporting financial entity, the accounting for these funds is preferably consolidated so that the multiple MMDAs are transparent to the investor. All Client funds exchanges and transactions may then post to a single Client account on the Agent database although the balances in this account may spread across multiple MMDAs held at multiple Supporting financial entities (represented as sub-accounts of the single Client account).

In a preferred embodiment, the functional relationship determining interest rate (for a particular Customer financial entity) is implemented largely with one or more interest rate tables. An interest rate table is known herein as a "tier set," which has one or more rows, known as "tiers." Each tier, or row, specifies at least a range for a selected, primary account characteristic along with the interest rate to be assigned to accounts when their selected characteristic is in the specified range. For example, where the selected characteristic is account balance, a tier set preferably includes tiers such that whatever its balance an account is assigned some interest rate (almost always, the higher the balance, the higher the assigned interest rate). One of skill in the art will appreciate that a selected functional relationship of account characteristics to interest rate may be implemented by a many tier sets. Because the relation between interest rate determination and tier sets is not unique, what is fundamental is the functional relation determining interest rate; a particular tier set is simply one expression of the fundamental functional relation specified by the Customer financial entity.

In one aspect of this embodiment, the Agent provides interest rates that vary as the amount of managed balances vary, generally the higher the balance, the higher the interest rate. The Agent database stores sets of tables referred to as "tier sets," each table returns interest rates (or a relative interest rate) as a function of the managed balance in a Client's account. During the process of interest allocation for a Client account, the Agent retrieves the tier set for a particular Client account, and applies the correct tier to the managed account balance to return an interest rate according to which the interest income is credited to the Client's account balance. The tier set for a particular Client account may be chosen according to information and flags stored as part of the Client information on the Agent database. The tier sets, tiers, and information for selecting tier sets and tiers may be provided by the Customer financial entity.

In a concrete preferred embodiment, a Customer financial entity, such as a broker/dealer, an investment advisor, a credit union, or other financial entity, may wish to pay higher interest rates to accounts with larger balances because they are usually more profitable than accounts with smaller balances, and may also wish to run interest rate promotions from time-to-time. Accordingly, this Customer financial entity may specify a tier set with a base tier set applicable to all its Clients in the absence of further indication in the account. Typically, a base tier set leads to the same interest rate for all account balances (for example, by having a single tier). The tier set would also have a standard tier set (or more than one) leading to increasing interest rates with increasing balances. Finally, there would be one or more promotional tier sets that determines the promotional interest rates. The promotion tier set may also include time information. For example, all Client accounts opened from April $1^{st}$ through June $30^{th}$ earn 5%, but after June $30^{th}$ all accounts in the tier group will default to a tier set that determines interest rates based on the balance in the account. Alternatively, the promotional tier set may specify that each account has an individual promotional period. For example, an account may earn a promotional rate for the first 60 days after it is opened at the Customer financial entity. On the $61^{st}$ day, the account will default to a standard.

As illustrated, the Agent is generally central in these information and funds exchanges, receiving and processing transaction data and then causing necessary funds transfers.

The Agent database also preferably additionally stores records describing and representing the Customer financial entities, such as records 15 and 16. These stored records represent at least Customer financial entity identification and such other information as the Agent needs to manage the Customer financial entity's Clients, including importantly parameters provided by the Customer financial entity to guide interest allocation. Thus the records describing Customer financial entity 1, records 15, include its interest allocation parameters and instructions 20, and those for Customer financial entity 20, records 16, include its interest allocation instructions 23. Where interest is allocated according to tier sets and tiers, the interest allocation records described the Customer-financial-entity-defined balance balance-tiers and associated interest rate, both of which may be changed by the Customer financial entity from time-to-time. Although FIG. 1A illustrates all the records for the individual Customer financial entities being grouped together, actual implementation of the Agent database may organize and physically store records in any manner convenient.

3. SUMMARY OF THE INVENTION

3.1 Objects of the Invention

To meet statutory and regulatory requirements, the Agent provides Clients through the Customer financial entities with information describing their accounts and their transactions held on the Agent's database. The Customer financial entity may decide to incorporate this account information into their statements to the client, or to have the Agent produce a separate statement. Thus, all activity sweeps, checks written debit/credit card transactions, and so forth appear in the account in the Clients' accounts as well as in the sub-accounts for the Clients when more than one supporting financial entity is used to provide FDIC insurance over $100,000. Although detail of these sub-accounts may or may not be reported to the client (at the option of the Customer financial entity), the Agent preferably provides the Clients at least with the balances held in each pooled MMDA at each Supporting financial entity.

Next, Client funds for which the Agent is responsible are managed at one or more Supporting banks (financial entities) 25, 26, and 27 in a manner to both qualify for FDIC insurance, limited to $100,000 per individual beneficial interest per Supporting financial entity, to earn interest, and to permit unlimited withdrawals. To satisfy regulatory requirements, each Supporting financial entity holds a pair of accounts, one account being an interest bearing money market deposit account (MMDA) in which all Client funds are deposited, and the other account being a demand deposit account (DDA) registered in the identical name as the first account (ex., "Administrator as agent for Clients"). For funds transfers from Supporting financial entities, the Agent, first, provides instructions to a messenger who personally requests the withdrawal from the MMDA to the associated DDA in a Supporting financial entity. Funds may be then wired from the DDA out of the Supporting financial entity by the Agent to cover client withdrawals from various sources. Transfer into the pooled MMDA may be direct or through the pooled DDA as dictated by operational convenience. As illustrated, Supporting bank 25 has linked MMDA 28 and DDA 29 between which the Agent exchanges funds 38'. Similarly, the Agent exchanges funds 38" between MMDA 30 and DDA 31 in Supporting bank 26.

Another important source of transactions are sweep transactions received in sweep file forwarded from the Customer financial entities. Where Client transactions made at a Customer financial entity in a certain period generate net credits, the Customer financial entity may sweep excess Client funds to the Agent. In case of the converse, where Client transactions generate net debits at the Customer financial entity, this entity may request funds from the Agent to cover such debits. Alternately, funds may be swept to or from the Agent when funds in Client accounts at Customer financial entities exceed or fall below, respectively, a desired or target minimum balance, which may be the same for all the Customer financial entity's clients, or may vary among the Clients. Sweep files may optionally also provide summary or detailed information on the subject Client transactions. The Agent also processes sweep files in real-time to update the net credits and debits and for each Customer financial entity (for each Client if the sweep file contains the necessary information).

Concerning sweep file 230 and its processing at 225, data in the sweep files result from a Customer financial entity's processing of Client debit and Client credit transactions received against this account in most recent complete period. For example, a Customer financial entity processes all Client transactions for the previous, ex., twenty-four hour period to generate the sweep file made available in the current twenty-four hour period. For broker/dealers, for example, these transactions would typically result from Client securities purchases or sales. This file is processed at 225 by the Agent to store the data by Client and Customer financial entity, to accumulate net debits or net credits by Client and Customer financial entity.

Interest earned by the MMDA accounts 229 is a further source of funds for Client accounts. This Interest accrues daily and is posted monthly in the MMDA at the Supporting financial entities and then in the Clients accounts. Interest allocation is performed as previously described in dependence on interest allocation parameters 257 usually supplied from time-to-time by the Customer financial entities.

The above account management processing, including interest allocation, is performed on Agent computer systems programmed to carry out the above methods. FIG. 3 illustrates exemplary systems that are configured from standard commercial-grade components, for example, mainframe-type system 301 coupled to data storage 302 for the Agent databases, here illustrated as the "insured deposits database." A typical processor may be from IBM using an OS/390 or MVS/ESA operating system or the equivalent; a typical database system may be DB2 from IBM or the equivalent, such as products from Oracle Corp.

The above-described elements of this invention relationships may be "packaged" variously to meet the needs of various Customer financial entities. In one embodiment, one Customer financial entity is linked to one Supporting financial entity, so that client accounts may be provided with up to $100,000 of FDIC insurance along with interest and unlimited withdrawals. In a second embodiment, one Customer financial entity is linked to more than one independent, Supporting financial entity so that its clients may receive more than $100,000 of FDIC insurance.

In a third embodiment, a Customer financial entity which is a bank or savings institution may wish to retain all Client funds on its own books so that they may be available for its normal financial activities. This is accommodated by having the Agent managed MMDA-DDA pair (or pairs) be held at the Customer financial entity. Otherwise, the Agent systems and methods are as described above. In this embodiment, Client insurance is limited to $100,000. In such an embodiment, the ownership interests managed by the Agent and recorded on its database may be advantageously realized as separate Client accounts at the Customer financial entity (referred to as a "return sweep account"). Then, a Client will have two accounts, one on the books of the Customer financial entity, for example, a Client demand deposit account, and a second account held on the books of the Agent, a return sweep account. The Agent then manages fund exchanges between these accounts so that the funds of all Client return sweep accounts are held in the managed MMDA-DDA pairs.

3.2 Regulatory Environment of the Invention

These prior-art problems are satisfied by systems and methods structured according to a novel and creative combination of certain of financial-entity and bank regulations first noticed and assembled by the inventors. First, although accounts that require withdrawal notice are not demand accounts and therefore may earn interest, certain accounts not requiring withdrawal notice may still be deemed "savings accounts" and capable of earning interest. For example, an account that does not require withdrawal notice (but may so require at any time) is nevertheless a savings account if no more than six transfers and withdrawals are made monthly. In particular, 12 C.F.R. § 204.2(d)(1) (underlining added) states:

> The term savings deposit also means: A deposit or account, such as an account commonly known as a passbook savings account, a statement savings account, or as a money market deposit account (MMDA) . . . from which . . . the depositor is permitted or authorized to make no more than six transfers and withdrawals . . . per calendar month or statement cycle . . . to another account (including a transaction account) of the depositor at the same institution or to a third party by means of a preauthorized or automatic transfer, or telephonic (including data transmission) agreement, order or instruction, and no more than three of the six such transfers may be made by check, draft, debit card, or similar order made by the depositor and payable to third parties.

However, the precise types of the transfer or withdrawal transaction are critical. An unlimited number of deposits into a savings account is always allowed, and an unlimited number of withdrawals is also allowed if they are of certain limited types. Importantly, 12 C.F.R. § 204.2(d)(2) (emphasis added) states:

> Such an account is not a transaction account by virtue of an arrangement . . . that permits transfers of funds from this account to another account of the same depositor at the same institution . . . when such transfers or withdrawals are made by mail, messenger, automated teller machine, or in person . . . .

Taken together, therefore, an unlimited number of transfers may be made between a deposit account, that is interest-earning, and a transaction account, that permits an unlimited number of withdrawals of any type, if both accounts are in the same institution, if both accounts are in the same name, and if the transfers are made by messenger. These transfers may be into or out of the interest-earning account, which in the following will be generally be referred to as a money market deposit account ("MMDA")

Second, the $100,000 liability limitation on FDIC insurance is not determined on a per-account basis, but instead on a per-insured-institution basis, and moreover, applies to all the beneficial ownership interests that a particular ownership category (for example, a particular individual) has in the insured institution, however the accounts or instruments in which these interests are held are actually denominated. Specifically, 12 U.S.C. § 1821(a)(1)(C) states the following (emphasis added):

> For the purpose of determining the net amount due to any depositor under subparagraph (B), the [FDIC] shall aggregate the amounts of all deposits in the insured depository institution which are maintained by a depositor in the same capacity and the same right for the benefit of the depositor either in the name of the depositor or in the name of any other person.

Without affecting the FDIC liability limit, ownership interests of a particular ownership category may be spread in several accounts or CDs in a single bank or may be held in a single third-party-managed account along with the funds of other ownership interests.

Therefore, the inventors have conceived and implemented arrangements whereby a single corporation, partnership, or other legal person (generally, "entity") acts as an agent of numerous individuals or other ownership interests (for example, joint ownership, ownership in trust (such as individual retirement accounts, and other legally established savings mechanisms), and so forth) to manage the funds of each ownership interest in the aggregate MMDAs in one or more Supporting financial entities so that each ownership interest's funds are earn interest while remaining FDIC insured with insurance up to $100,000 per each participating Supporting banking financial entity. Further, each Supporting financial entity, such as a bank or a saving institution, holds a single MMDA that is paired with a single corresponding DDA in the same name so that each ownership interest's use of managed funds is not limited.

A major advantage of the inventors' combination is that funds can be managed for any type of client (for example, individual, business entity, governmental entity), because there are no limitations on the type of depositor in a MMDA. Already known account management methods, require an individual account for each participating client resulting in hundreds (or even thousands) of separate accounts at supporting financial entities. Further, where these are NOW accounts, the type of client is limited by Federal banking law.

Further, since many such ownership interests hold their funds in broker/dealers, savings institutions, credit unions, or other financial entities, it is preferable that the agent entity interface to these funds-holding financial entities, and act as their agent where necessary, for the movement of managed funds between these institutions and the managed MMDA-DDA pairs. Additionally, the agency role of the agent entity also extends to a record-keeper function to a greater or lesser degree depending on the Customer financial entity. The Agent then also receives and processes account transaction information generated by all manner of financial instruments and payment vehicles, as well as simply managing the above funds transfers.

The processing for carrying out such funds management as well as any record-keeping functions is implemented by the systems and methods described in the following, where the following terms are used with the indicated meanings:

"Agent", or "Administrator/agent", or "Administrator": collectively refer to the agent entity having an agency (or trustee, or contractual, or other legal) relationship with the individual ownership interests for which it manages funds and (optionally) with the financial institutions or entities where these funds are held.

"Customer financial entity" or "Customer": collectively refer to these financial institutions or financial entities (such as broker/dealers, Investment Advisors, savings institutions, credit unions, and the like) whose client have ownership interests in the one or more deposit accounts managed by the Agents.

"Client of a Customer financial entity" or "Client": collectively refer to the ownership interests that have deposited agent-managed funds at Customer financial entities; the types of Client deposits may be, for example, individual accounts, joint accounts, trust accounts, profit or non-profit corporations, limited liability corporations, partnerships or other forms of business entities, government agencies, municipalities, ERISA accounts, non-US accounts, and the like.

"Client account": refers to the accounts in the Customer financial entities where Clients hold the funds that are managed by Agent.

"Supporting financial entity": refers to those financial entities, preferably such as banks and savings institutions, where the MMDA-DDA pairs are held by the Agent, with the MMDA being interest earning and FDIC insured (If Supporting financial entities are referred to in the following as Supporting banks, no limitations is intended.)

These terms refer to roles, and the use of different names does not imply that separate roles must be played by separate entities. For example, in certain embodiments, the Customer financial entity may be its own Supporting financial entity, or may be commonly controlled with its Supporting financial entity. In certain embodiments, the Agent itself may accept funds from its own Clients, and thus also have the role of a Customer, or the Agent may be commonly controlled with a financial entity that accepts funds and has a Customer role.

3.3 Systems and Methods of the Inventions

To accomplish these and other objectives, this invention provides systems and methods for managing a plurality of Clients of one or more Customer financial entities by administering at one or more Supporting financial entities, such as banking or savings institutions, an FDIC-insured MMDA (money market deposit account) maintained at each participating Supporting financial entity in which are held some of all of the funds in the managed Client accounts, and for managing an Agent database recording the financial information describing the managed Client balances, Client information for each Client's account, Customer information for each Customer financial entity, financial information describing each aggregate MMDA held at a Supporting financial entity, and information for each Supporting financial entity. Where Client funds are held across more than one MMDA, the funds may be insured to more than $100,000. For example, if they are held in two (or three, or four) MMDAs (each MMDA held in a different Supporting financial entity), then insurance may be $200,000 (or $300,000, or $400,000).

The Agent also acts as a record keeper for Customer financial entities by directly processing Client deposit and withdrawal transactions in each managed Client account. Processed transactions may be received directly from a wide array of sources (transaction sources). For example, for Client accounts, deposits may be received by means of various electronic and hand delivery systems, and payments may be tendered by means of various financial instruments and payment vehicles, all without limitation as to the number of transfers while interest is earned on the managed, insured Client funds. Optionally, the debiting of funds from each of the client accounts may be monitored, and debits may be authorized or rejected based upon the Client's account balance. In this embodiment, the Agent also maintains on its database records of processed Client transactions (Client deposit and withdrawal transactions), as well as financial information describing the funds managed for each Client and deposited in a MMDA at various Supporting financial entities.

In more detail, the Agent manages in each Supporting financial entity (bank or saving institution) an aggregate money market deposit account (MMDA) and an aggregate demand deposit account (DDA), both being in the identical name of the agent for its principals (referred to herein as an "MMDA-DDA pair"). In response to Client deposit and withdrawal transactions stored on the Agent's database, the Agent initiates transfers of funds between the MMDA-DDA pairs, so that if the aggregate deposits of all Clients exceed the aggregate client withdrawals (net Client credit), then all or some of the funds are deposited in the MMDA at the Supporting financial entity, and conversely if client withdrawals exceed client deposits (net Client debit) the Supporting financial entity will be instructed by messenger to transfer funds from the aggregate MMDA to the DDA.

The MMDAs are interest-bearing, insured deposit accounts, collectively in which the managed balances for all Clients of the Agent are deposited. The DDAs, which are deposit accounts permitting an unlimited number of deposits and withdrawals, serve to facilitate the exchange of funds between the MMDAs, the Customer financial entities, and sources of Client transactions (referred to herein as "transaction sources"). If the Agent determines that it is necessary to move funds from a particular MMDA (at a particular Supporting financial entity or bank), it first causes a messenger to have these funds transferred from the MMDA to the DDA member of the MMDA-DDA pair, and second, causes the funds in the DDA to be moved to the Agent's own account or accounts. Then, from the Agent's own accounts, funds may be further transferred to a $3^{rd}$ party, such as a transaction source or a Customer financial entity (preferably by electronic or other automatic means). If funds are to be moved into a particular MMDA, the Agent either may have them deposited into the associated DDA and then moved into the MMDA, or may have them deposited directly into the MMDA. The Agent database is updated to reflect these funds transfers.

In certain embodiments, where the Agent has a single MMDA-DDA pair in which all Agent-managed Client funds are held, Client liability insurance is limited to $100,000. In other embodiments, where it is preferable to provide Clients with more than $100,000 of insurance, the Agent has two or more MMDA-DDA pairs, each pair in a different Supporting financial entity, and it manages Client funds so that each Client's ownership interest at any one Supporting financial entity never exceeds $100,000. For example, when a Client's balance exceeds $90,000 (or some other operational threshold not greater than $100,000) in the aggregate MMDA at a particular Supporting financial entity, excess funds are automatically moved to a MMDA at a second Supporting financial entity. Although, Client funds may be from time-to-time be deposited at several Supporting financial entity, the accounting for this funds is preferably consolidated so that the multiple MMDAs are transparent to the investor. All Client funds exchanges and transactions may then post to a single Client account on the Agent database although the balances in this account may spread across multiple MMDAs held at multiple Supporting financial entities (represented as sub-accounts of the single Client account).

The agent also maintains sub-accounts which are attached to the client account on the Agent's database. Each sub-account represents the Client's ownership in the MMDA at the Supporting financial entities. Alternatively, the Agent may generate statements and reports for the Client showing the sub-accounts where the Client's funds are actually held and in which Supporting financial entity individual transactions occurred.

At the time a Client commences using Agent services (or, alternatively. opens a managed account with the Agent associated with an account at a Customer financial entity), the Client is given the option to choose a preferred Supporting financial entity, to chose a list of preferred Supporting financial entities in a desired (or random) order of preference, to exclude one or more Supporting financial entities, and the like. The Client may also select the order of preference for deposits and withdrawals. The Agent will then exchange funds with aggregate MMDAs on the Client's behalf, each at a different Supporting financial entity, according to the Client-supplied preferences. In the event that the Client does not supply preferences for the Supporting financial entities, the Agent may automatically designate a list of preferred Supporting financial entities (for example, as a default). Preferences for Supporting financial entities are preferably stored in the Agent database in association with Client's account information, and will be retrieved to determine which Supporting financial entity should accept or provide funds for each net Client credit or debit. Note, that the Agent automatically groups together transactions for each Supporting financial entity, and at the end of the business day, the funds are transferred either to the MMDAs or from the MMDAs via the DDA at the various Supporting financial entities. The transfer to or from the MMDA is the net transaction for all activity that occurred that day.

For example, a Client may open an Agent-managed account with $170,000, and may also indicate that these funds should be held in Supporting financial entity A and Supporting financial entity C with Supporting financial entity C preferred. Then $90,000 (or some other threshold) would be deposited into Supporting financial entity C and $80,000 into Supporting financial entity A. If a check were written or if the Client investor chose to redeem funds directly, the withdrawals would be made first from Supporting financial entity A. Withdrawals would not be made from Supporting financial entity C until all funds had been redeemed from Supporting financial entity A. Similarly, if the Client chose Supporting financial entity C as preferred, and chose to exclude Supporting financial entity. B, then $90,000 would be deposited into Supporting financial entity C and $80,000 into Supporting financial entity A.

Because the systems and methods of this invention seek to minimize risk as much as possible for its Clients and Customer financial entities, the Agent may choose a deposit cap for each of the multiple Supporting entities. For example, it is preferred that the Agent's total deposits at a Supporting financial entity are preferably no more than 10% of the total deposits at the Supporting financial entity (less preferably, no more the 20%; and much less preferably, no more than 30%). For example, if the total deposits at a particular Supporting financial entity are $1,000,000,000, then the Agent's total deposits at that entity are preferably no more than 10% of this amount or $100,000,000 (less preferably, no more the $200,000,000; and much less preferably, no more than $300,000,000).

The Client may also choose a deposit cap for each of the multiple Supporting financial entities selected, or can specify deposit caps for default Supporting financial entities chosen by the Agent. Of course, the Client may also specify that all funds be held in a single Supporting financial entity, even if the amount exceeds $100,000 (insurance being limited to $100,000 in this case). The Agent may generate statements and reports for the Client either showing only all of the managed assets and transactions as a single account, or also showing the sub-accounts where the Client's funds are held and in which Supporting financial entity transactions occurred.

In these embodiments, therefore, a Clients may earn interest on balances being managed by the Agent. These managed funds will be FDIC insured up to $100,000 per Supporting financial entity and with no withdrawal limits.

3.4 Flexible Interest Allocation

Importantly, the Agent provides the ability to flexibly allocate interest income earned by the MMDAs to each Client in a manner specified by the Customer financial entities. Generally, the Agent distributes all the interest or a portion of the interest (the remainder being applied to Agent fees) accrued by the MMDAs to individual Clients having ownership interests in the MMDAs by allocating this interest to the Agent-managed balances of these Clients. Although interest may be distributed by default in proportion to each Client's ownership interest in the MMDAs, it is more preferably for the Agent to distribute the interest as specified by the Customer financial entities. For example, each Customer financial entity may specify methods of interest allocation for its own Clients. This feature allows a Customer financial entity to relatively reward or penalize certain types of accounts in accordance with that Customer financial entity's management or marketing objectives.

Generally, a Customer financial entity specifies interest allocation methods to the Agent by providing parameters that determine a functional relationship between one or more characteristics of a Client account and an interest rate used to compute interest income on the Client's balances. Interest rate may depend on a wide variety of Client-account characteristics, such as, for example, Agent-managed balances, total Client balances at the Customer financial institution, date the Client account was opened, duration the Client has transacted business with the Customer financial entity, address of the Client account, Customer policies and promotions, and so forth. The actual functional relationship between interest rate and such Client characteristics, its parameterization, and its implementation in the Agent systems and methods may be virtually limitless. However, since the variable interest allocation is generally intended to motivate desirable Client behavior measured by one or a few key account characteristics, the interest rate will usually increase (or decrease) monotonically in dependence on the few key characteristics.

In a preferred embodiment, the functional relationship determining interest rate (for a particular Customer financial entity) is implemented largely with one or more interest rate tables. An interest rate table is known herein as a "tier set", which has one or more rows, known as "tiers". Each tier, or row, specifies at least a range for a selected, primary account characteristic along with the interest rate to be assigned to accounts when their selected characteristic in the specified range. For example, where the selected characteristic is account balance, a tier set preferably includes tiers such that whatever its balance an account is assigned some interest rate (almost always, the higher the balance, the higher the assigned interest rate). One of skill in the art will appreciate that a selected functional relationship of account characteristics to interest rate may be implemented by a many tier sets. Because the relation between interest rate determination and tier sets is not unique, what is fundamental is the functional relation determining interest rate; a particular tier set is simply one expression of the fundamental functional relation specified by the Customer financial entity.

In one aspect of this embodiment, the Agent provides interest rates that vary as the amount of managed balances vary, generally the higher the balance, the higher the interest rate. The Agent database stores sets of tables referred to as "tier sets", each table returns interest rates (or a relative interest rate) as a function of the managed balance in a Client's account. During the process of interest allocation for a Client account, the Agent retrieves the tier set for a particular Client account, and applies the correct tier to the managed account balance to return an interest rate according to which the interest income is credited to the Client's account balance. The tier set for a particular Client account may be chosen according to information an flags stored as part of the Client information on the Agent database. The tier sets, tiers, and information for selecting tier sets and tiers may be provided by the Customer financial entity.

In another aspect, a Customer financial entity would define its interest allocation with two or more tiers forming a tier set, where the tiers are indexed by additional account characteristics. Then, given a particular Client account, a particular tier in the tier set would be selected according to the additional account characteristics, and the interest rate determined from the particular tier according to the primary characteristic of the Client account. Selection of a tier from a tier set may also depend on policies of the Customer financial entities. For example, a Customer financial entity may decide to start an interest-rate promotion using promotional tiers in the tier set. Then, the Agent would test (for example, a promotions flag in the Customer financial entity data records) to determine if promotional tier should be used to set interest rates.

Tiers in tier sets may have information in addition to a primary-characteristic range and a corresponding interest rate. For example, a tier may have a date range so that it is used to set interest rates only if the date is in the range. The date may be specified absolutely, or relatively, for example, with respect to the opening date of a Client account. Instead of specifying an actual interest rate, a promotional tier may specify an additive or multiplicative amount to be applied to a non-promotional or base interest rate.

The Agent database stores the information necessary to parameterize interest allocation and to determine an interest rate for a Client account. In the case of tiering, this database would store the tiers, tier sets, and the like among the records for the Customer financial entities. The Client account records in the database would also have information (such a flags indicating promotions) concerning account characteristics necessary for the tiering computation. Also, the Customer financial entity records may store policy flags and other data, if necessary for tier set selection.

In a concrete preferred embodiment, a Customer financial entity, such as a broker/dealer, an investment advisor, a credit union, or other financial entity, may wish to pay higher interest rates to accounts with larger balances because they are usually more profitable than accounts with smaller balances, and may also wish to run interest rate promotions from time-to-time. Accordingly, this Customer financial entity may specify a tier set with a base tier set applicable to all its Client in the absence of further indication in the account. Typically, a base tier set leads to the same interest rate for all account balances (for example, by having a single tier). The tier set would also have a standard tier set (or more than one) leading to increasing interest rates with increasing balances. Finally, there would be one or more promotional tier sets that determines the promotional interest rates. The promotion tier set may also include time information. For example, all Client accounts opened from April $1^{st}$ through June $30^{th}$ earn 5%, but after June $30^{th}$ all accounts in the tier group will default to the a tier set that determines interest rates based on the balance in the account. Alternatively, the promotional tier set may specify that each account has an individual promotional period. For example, an account may earn a promotional rate for the first 60 days after it is opened at the Customer financial entity. On the $61^{st}$ day, the account will default to a standard.

Further, in this concrete embodiment, the Client account records for the Customer financial entity in the Agent database would have one or more tier set indicators, or other flags or data, that specify which tier set to apply to this Client. Agent methods would provide the Customer financial entity with the ability to set this indicator from time-to-time so that the intended accounts will have intended interest rates.

The wide flexibility of these embodiments is illustrated by the wide choice of tier sets and of the wide choice of characteristics and factors defining particular tiers in the tier sets. For example, a Customer financial entity may select a group of clients it wishes to favor or attract. In order to expand into a new geographic area or market segment, it may wish to favor such Clients. Clients may be favored if they transact additional business with the Customer financial entity, and so forth. This Customer financial entity may then supply the agent with the favored tier set and tiers along with appropriate Client identification information so that and the selected Clients (by residence, customer type, business characteristics, or the like) will receive the targeted rates. In this manner, a Customer financial entity may even choose to reward individual Clients identified by name or account number. Further tier sets and functions may depend on variables other than the managed account balances. Such other variables may include the total amount that a Client has invested at (or on loan from) a Customer financial entity (whether or not managed by the Agent), the length of time that the Client has been transacting business with the Customer financial entity, and so forth as will be apparent to those of skill in the art.

In the certain cases, a Customer financial entity's requested interest allocation may require more funds to be credited to its Clients than is generated by interest income from the Client funds managed in the MMDAs. The Customer financial entity may then be requested to transfer funds to cover this interest income shortfall. In the converse case, the Agent may transfer excess interest income to the Customer financial entity for its own use.

Agent operation for tiered interest rate implementation is flexibly programmed so that any number of tier sets, based tier sets, promotional tier sets, and tiers can be utilized with full adjustment of tier numbers, levels and time period, as selected and controlled by the Customer financial entity. The Customer financial entity may also indicate the duration of promotional tiers or interest rates and provide Client information fields and flags so that the Agent may chose the Customer financial entity's intended tier for each Client.

In other embodiments, interest rates may be determined by methods that are not table driven. The Customer financial entity may provide rules (such as "IF-THEN" rules) that the Agent will execute for each Client in order to determine the intended interest rate. The "IF" part of these rules will depend on such characteristics and indicators as are described above. The "THEN" parts may return an interest rate or link to further rules for further tests. In a further implementation, the Customer financial entity may even provide an executable module that the Agent will "call" (or otherwise execute) during interest rate allocation and that returns an interest rate suitable for each Client account.

Clearly, other embodiments that include other combinations of the basic features of this invention may be appropriate for other Customer financial entities. This invention would be understood by one of skill in the art to include such other embodiments.

4. BRIEF DESCRIPTION OF THE DRAWINGS

The present invention may be understood more fully by reference to the following detailed description of the preferred embodiment of the present invention, illustrative examples of specific embodiments of the invention and the appended figures in which.

5. DETAILED DESCRIPTION OF THE PREFERRED EMBODIMENTS

Described next are specific preferred embodiments that are within the general scope of the invention as set forth in the preceding section. This description includes preferred details of the Agent-managed accounts and funds transfers, preferred interest allocation methods, and exemplary processing methods and systems.

5.2 Agent-Managed Accounts

Figure 1A:
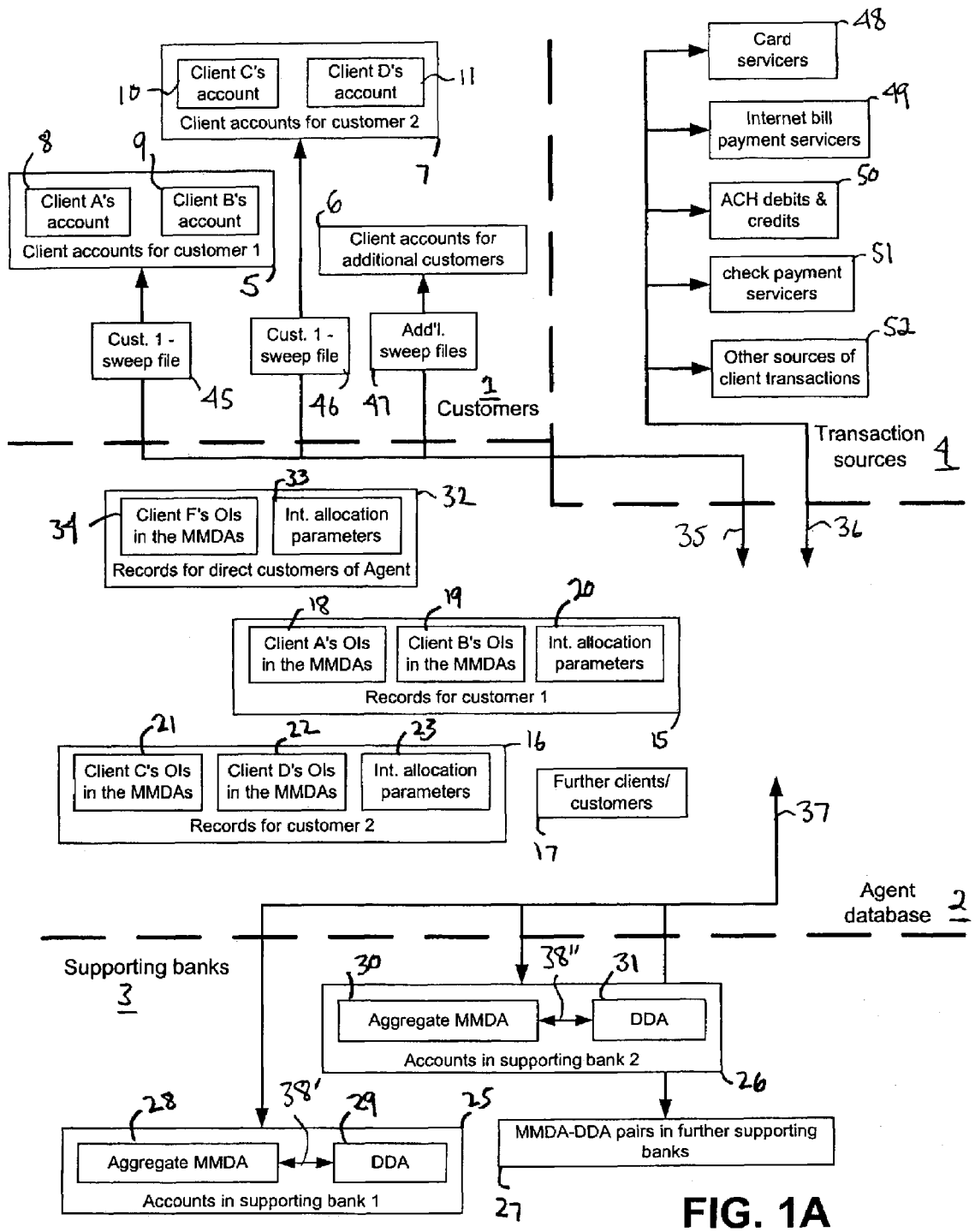
FIG. 1A illustrates an exemplary embodiment of accounts, funds flows between accounts, and database records managed by the Agent, where MMDA refers to money market deposit account, where DDA refers to demand deposit account, and where OI refers to ownership interests of Clients in the MMDAs.

FIG. 1A is a exemplary general embodiment of the financial relationships and legal relationships (contractual, agency, and the like) that are present in this invention. Centrally illustrated in FIG. 1A are Agent and Agent database 2 with exemplary records 18, 19, 20, 21, 22, 23, 32, 33, and 34. Records 18 and 19 are for Clients of Customer financial entity 1, and record 20 holds the interest allocation parameters prescribed by that Customer financial entity. Similarly, the Agent database stores Client records 21 and 22 and interest allocation parameter record 23 for Customer financial entity 2. In various embodiments, the organization sponsoring the Agent, or an organization commonly controlled with the Agent organization, may have its own direct clients with Agent-managed accounts. Hence, also stored are Client record 34 and interest allocation parameter record 33 for direct Clients of the Agent. Finally, records 17 are Agent database records for further Customer financial entities.

It will be understood that certain non-essential aspects illustrated in FIG. 1A (and in the other figures) are for convenience of illustration and are not to be taken as limiting. Thus, while records 15 for Customer financial entity 1 (and records 16 for Customer financial entity 2, and records 32 for the Agent's direct Clients) are illustrated as grouped, they may be structured in an actual Agent database in any convenient manner known in the art. Also, although each of the records is illustrated by a single block, this information may be actually stored in any number of logical or physical records.

Next, exemplary Customer financial entities are illustrated in the upper left section of FIG. 1A. Accordingly, Customer financial entities 5 and 7 have respective Client accounts 8, 9, 10, and 11. Client A has account records 8 and corresponding Agent records 18; and similarly Client B has records 9 and 19; Client C has records 10 and 21; and Client D has records 11 and 22. There will usually be further Clients and Customer financial entities 6 with corresponding Agent data 17. Records of direct Agent clients, such as record 34, combine both Customer-like information with Agent-like information. Although the Agent may appear to Clients of Customer financial entities as a bank-like financial entity, it is not actually a bank and holds no funds. All Agent-managed funds are held in money market deposit accounts in Supporting financial entities banks. Thus, illustrated in the bottom section of FIG. 1A is exemplary Supporting bank 25 with MMDA 28 linked to DDA 29, and exemplary Supporting bank 26 with its MMDA 30 linked to DDA 31. An embodiment may use additional Supporting banks 27. As illustrated, each Supporting financial entity holds a single MMDA and a corresponding DDA.

Further, the Agent exchanges funds and information with one or more, and usually several, transaction-processing financial entities illustrated in the upper right segment of FIG. 1A. It is by means of these transaction-processing financial entities, which preferably service many of the transaction vehicles provided by modern financial services, that Clients may access their Agent-managed funds for deposits and withdrawals. FIG. 1A individually illustrates several significant transaction sources. Thus, card services 48 represents credit and debit card processing organizations and networks. Internet bill payment services 49 represents service providers for bill payment, checks, and funds exchanges generally by means of the Internet (or other electronic or network means). ACH debits and credits 50 represents various direct deposit and withdrawal clearinghouse services. Check payment servicers 51 represent debit and credit transactions generated by paper check processing. Because these individually illustrated transaction sources are illustrative and not limiting, other transaction sources 52 represents transactions generated as a result of other payment vehicles (such as touch-tone bill payment). Accordingly, Clients may access their Agent managed funds by credit and debit cards, for Internet transactions, by direct deposits and withdrawals, by checks, and by other payment and funds exchange vehicles.

Various embodiments of the invention may provide more or fewer transaction sources as well as transaction sources of different types (or of types yet to be developed). In other embodiments, one or more (up to all) transaction sources may interface with the Customer financial entities, which then provide summary information to the Agent via the illustrated sweep files. For example, in the case of broker/dealers, investment advisors, and the like, securities transactions may be processed directly by these Customer financial entities. In this embodiment, the Agent may directly interface with only a few or no transaction sources.

Lastly, FIG. 1A illustrates information and funds exchanges present in general embodiments of the invention that are between the Agent and these financial entities that cooperate to provide the Agent-managed accounts of this invention. Exchanges 36 are between the Agent and the transaction sources. These transaction sources typically package a day's transactions in transaction files which are transmitted daily to the Agent. The Agent causes necessary funds' exchanges by, for example, wire transfers between Agent accounts and the transaction-source financial entities.

Exchanges 35 are between the Customer financial entities and the Agent, and are usually implemented by exchange of sweep files, such as sweep files 45, 46, and 47. These sweep files usually have instructions for funds transfer between the Agent and its Customer financial entities along with summary transaction information. Funds transfers here are also typically implemented by wire transfers between Agent accounts and the Customer financial entities.

Finally, exchanges 37 are between the Agent and its Supporting financial entities (banks and savings institutions). These (usually) daily transfers preferably balance the net results of all prior Customer financial entity and Client transaction activity exchanges 35 and 36 by making necessary deposits or withdrawals at the Supporting financial entities. Importantly, the Agent causes withdrawals by, inter alia, generating instructions for a messenger to have the Supporting financial entities move funds from their MMDAs to their corresponding DDAs.

As illustrated, the Agent in generally central in these information and funds exchanges, receiving and processing transaction data and then causing necessary funds transfers.

For each Client account at a Customer financial entity participating in Agent services, the Agent tracks managed funds by storing one or more database records (representing "accounts") with financial information describing the Client funds being managed by the Agent. As illustrated, Client A's account 8 and Client B's account 9 at Customer financial entity 1 correspond to stored records 18 and 19; similarly, Client C's account 10 and Client D's account 11 at Customer financial entity 2 correspond to stored records 21 and 22. This financial information describes, at least, each Client's ownership interests ("OIs") in the MMDA at each Supporting financial entity, that is the amount of that Client's funds held in each MMDA, along with the total funds being managed for that Client (namely, the sum of the MMDA OIs). The Client records also preferably store information representing basic Client identifications, such as name, address, social security number, and the like, information representing Customer financial entity association, such as Client account number at the Customer financial entity, Client characteristics at the Customer financial entity important to Agent management, and the like, and additional Client related information (not illustrated).

The Agent database also preferably additional stores records describing representing the Customer financial entities, such as records 15 and 16. These stored records represent at least Customer financial entity identification and such other information as the Agent needs to manage the Customer financial entity's Clients, including importantly parameters provided by the Customer financial entity to guide interest allocation. Thus the records describing Customer financial entity 1, records 15, include its interest allocation parameters and instructions 20, and those for Customer financial entity 20, records 16, include its interest allocation instructions 23. Where interest is allocated according to tier sets and tiers, the interest allocation records described the Customer-financial-entity-defined balance balance-tiers and associated interest rate, both of which may be changed by the Customer financial entity from time-to-time. Although FIG. 1A illustrates all the records for the individual Customer financial entities being grouped together, actual implementation of the Agent database may organize and physically store records in any manner convenient.

To meet statutory and regulatory requirements, the Agent provides Clients through the Customer financial entities with information describing their accounts and their transactions held on the Agent's database. The Customer financial entity may decide to incorporate this account information into their statements to the client, or to have the Agent produce a separate statement. Thus, all activity sweeps, checks written debit/credit card transactions, and so forth appear in the account in the Clients' accounts as well as in the sub-accounts for the Clients when more than on supporting financial entity is used to provide FDIC insurance over $100,000. Although detail of these sub-accounts may or may not be reported to the client (at the option of the Customer financial entity), the Agent preferably provides the Clients at least with the balances held in each pooled MMDA at each Supporting financial entity.

Next, Client funds for which the Agent is responsible are managed at one or more Supporting banks (financial entities) 25, 26, and 27 in a manner to both qualify for FDIC insurance, limited to $100,000 per individual beneficial interest per Supporting financial entity, to earn interest, and to permit unlimited withdrawals. To satisfy regulatory requirements, each Supporting financial entity holds a pair of accounts, one account being an interest bearing money market deposit account (MMDA) in which all Client funds are deposited, and the other account being a demand deposit account (DDA) registered in the identical name as the first account (ex., "Administrator as agent for Clients"). For funds transfers from Supporting financial entities, the Agent, first, provides instructions to a messenger who personally requests the withdrawal from the MMDA to the associated DDA in a Supporting financial entity. Funds may be then wired from the DDA out of the Supporting financial entity by the Agent to cover client withdrawals from various sources. Transfer into the pooled MMDA may be direct of through the pooled DDA as dictated by operational convenience. As illustrated, Supporting bank 25 has linked MMDA 28 and DDA 29 between which the Agent exchanges funds 38'. Similarly, the Agent exchanges funds 38" between MMDA 30 and DDA 31 in Supporting bank 26.

5.3 Agent-Managed Funds Transfers

Generally, in this invention, the Agent receives actual funds from various financial entities and wires funds out to various financial entities, namely, the Customer financial entities 35, the Supporting financial entities 37, vendors (also referred to as transaction sources) that provide services for the Clients 36, and also direct Clients of the Agent that are not associated with any Customer financial entity. The Agent receives funds from various sources, such as sweep purchases of Clients at Customer financial entities, checks, wire transfers, ACH incoming transactions for, e.g., Client payroll and Client social security deposits, into a subscription account (or several subscription accounts) for further credit to the client's account as a deposit. These funds (after being netted against Client debits) are then to be deposited into the Supporting financial entity. The Agent also sends funds from the subscription account or accounts to pay for various types of withdrawals, such as on-line bill payment capabilities for Clients, ACH debits received from other banks at Clients' requests, touch-tone bill payment, and so forth. Further, the Agent may send funds for checks presented for payment against the Client accounts and for card transactions.

In more detail, the Agent determines the amounts of actual funds to transfer as a result of processing transactions received during its financial processing cycle (usually daily, but other periods known in the art may be used). One important source of transactions are vendors that provide payment services (both credits and debits) for the Clients and that periodically (e.g., daily) forward files to the Agent containing accumulated transactions of the Clients of the Agent (illustrated as Transaction sources 4 in FIG. 1A). Services provided by such vendors include processing of credit and debit cards, ACH credits and debits, Internet bill payments, check payments, and of other types of transaction known in the art. These transaction files are processed, preferably when received (in real-time), by the Agent to update the net credits and debits for each Client, and also the net credits and debits for each Customer financial entity in view of its Clients' net activities.

Another important source of transactions are sweep transactions received in sweep file forwarded from the Customer financial entities. Where Client transactions made at a Customer financial entity in a certain period generate net credits, the Customer financial entity may sweep excess Client funds to the Agent. In case of the converse, where Client transactions generate net debits at the Customer financial entity, this entity may request funds from the Agent to cover such debits. Alternately, funds may be swept to or from the Agent when funds in Client accounts at Customer financial entities exceed or fall below, respectively, a desired or target minimum balance, which may be the same for all the Customer financial entity's clients, or may vary among the Clients. Sweep files may optionally also summary or detailed information on the subject Client transactions. The Agent also processes sweep files in real-time to update the net credits and debits and for each Customer financial entity (for each Client if the sweep file contains the necessary information).

Resulting from this transaction processing are final net credits or final net debits due at each Customer financial entity and at each service vendor that provides a transaction file. The Agent may cause these net funds to be transferred by wire or other means at any time after the final nets are determined. Next, the resulting final net Client credits or net Client debits are allocated among the MMDAs. Where an embodiment manages only a single MMDA at a single Supporting financial entity, then all the net Client credits and debits are netted to a final amount to exchange with this Supporting financial entity. Where several MMDAs are managed at different Supporting financial entities, the final net Client credits or net Client debits are allocated among the available MMDAs according to preferences stored in the Client database records. These allocated amounts for all the Clients are then netted to obtain the final amounts to exchange with each of the Supporting financial entities. Funds transfers with the Supporting banks are managed as described above (with messengers for withdrawals) in order to satisfy regulatory requirements.

Concurrently, the Agent database is updated with information in the received transaction files so that it may track deposits to, and withdrawals from, each of the Client accounts at the Customer financial entities, Customer sweep activity, and the like. The database is further updated with net credits and net debit information and with funds transfer information, as well as with each Client's current proportionate and/or monetary share in the MMDAs.

Preferably, the foregoing procedures are structured in a manner so as to permit broker/dealers, savings institutions, credit unions and other Customer financial entities to continue servicing their Clients as they have done in the past with minimum disruption to their existing processes and systems. In this manner, the invention would be virtually transparent to presently-existing financial entities, and Customer financial entity personnel would not be burdened with the requirement to perform unfamiliar and potentially time-consuming procedures.

5.4 Methods of Interest Allocation

Figure 1B:
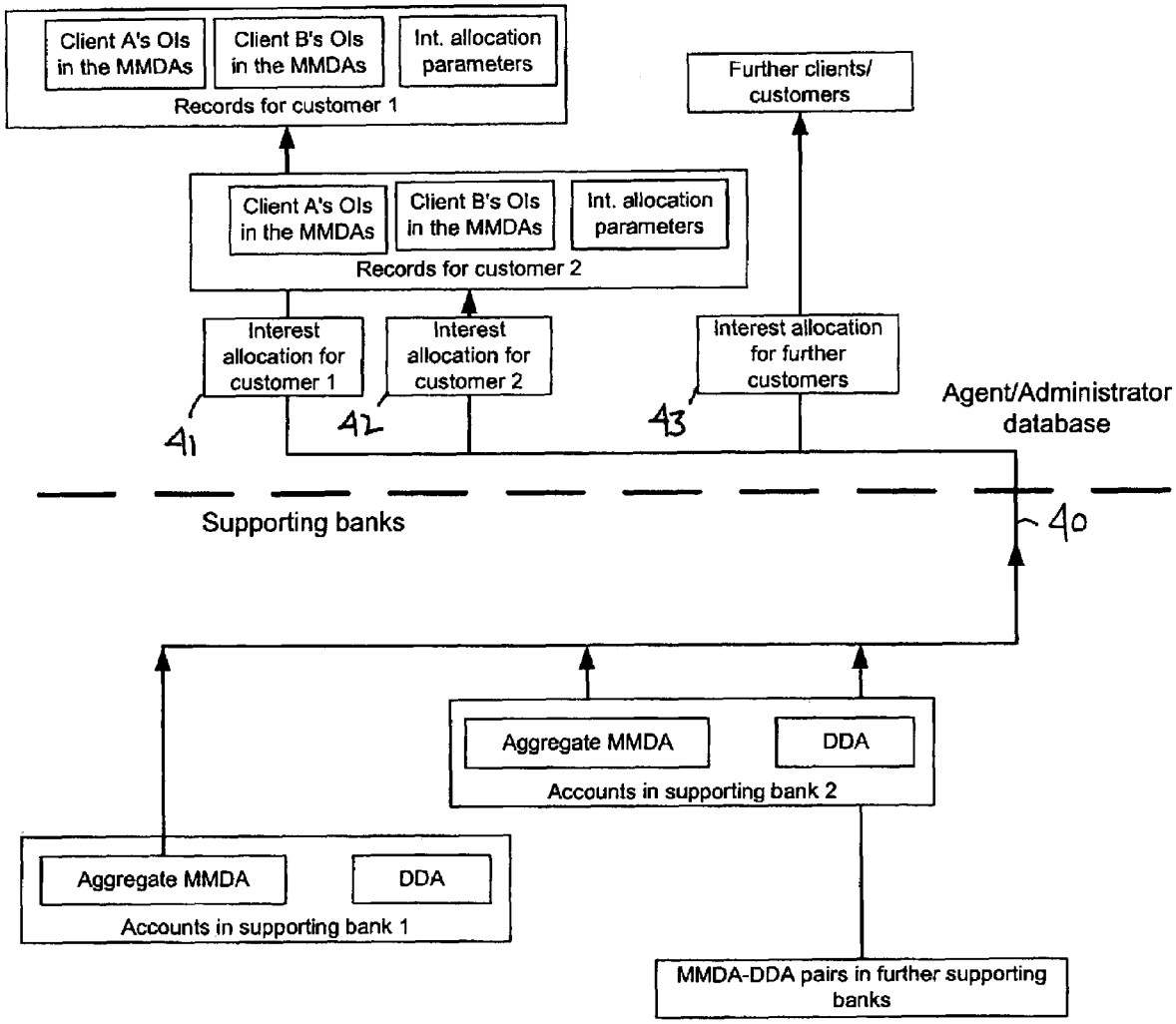
FIG. 1B illustrates interest an exemplary embodiment of interest allocation in the invention

As the MMDAs at the various Supporting financial entities accrue interest, all or a portion (for example, interest less Agent fees) of this interest is distributed to individual Clients. FIG. 1B, which is identical to FIG. 1A except that funds exchanges 35, 36, and 37 of FIG. 1A are absent and interest distribution 40 is present, details this important Agent function. Each pooled (or aggregate) MMDA preferably earns a maximum interest return compatible with its insured status, which is credited by the Supporting financial entity to the MMDA. The Agent then distributes ownership of accrued interest to the ownership interest ("OIs") of individual Clients which are recorded in the Client records in the Agent database. In FIG. 1B, this interest distribution (also referred to herein as "interest allocation") is illustrated by multiply-headed arrow 40 linking the MMDAs, where the interest is accrued, to the Agent database records, where the interest is accounted for by increases in the Client OIs. This function does not necessarily involve actual funds transfer, because the distributed interest is accrued periodically in the Client's accounts and may be withdrawn according to the funds exchanges illustrated in FIG. 1A in response to debits in Client accounts.

Interest allocation, or distribution, may be performed by several methods. In a simple method, interest earned by an MMDA is proportionally allocated to the Clients according to the relative OIs in that MMDA. It is preferable, however, to allocate interest flexibly and especially in response to requests of the Customer financial entities. Accordingly, FIG. 1B illustrates that interest for the Clients of Customer financial entity 1 are allocated according to allocation methods 41; interest for the Clients of Customer financial entity 2 are allocated according to allocation methods 42; and further Customer financial entities may request further allocation methods 43. These allocation methods may simply be based on relative OIs (optionally, the Agent's default allocation method), or may be procedures provided by the Agent but parameterized by the Customer financial entities, or may be provided as a complete allocation procedure by the Customer financial entities. Depending on the Customer financial entity's chosen allocation method and the distribution of Clients of the Customer financial entity, the Agent may distribute an amount of interest that does not equal the interest returned from the MMDAs for this Customer financial entity.

The total amount of interest to be allocated to all the Clients of a single Customer financial entity (the Customer financial entity's share of the interest) is usually set to be the proportionate to those Clients' share of the total interest earned by the MMDAs. The Customer financial entity's allocation method than allocates that total among the Customer financial entity's Clients. It may happen the Customer financial entity's chosen allocation method distributes more or less than that that Customer financial entity's share. In this case, excess interest may be transferred to the Customer financial entity and deficits requested from the Customer financial entity. Optionally, the Agent itself may allocate interest among its Customer financial entities in an other-than-proportionate manner in order, for example, to encourage Customer financial entities to provide more Clients for the Agent.

Advantageously, interest allocation methods may be further customized to meet Customer financial entity marketing needs, such as acquiring new deposits, encouraging larger deposits, and so forth. Broker/dealer customers would find this facility especially advantageous because statute and regulation have prevented them from offering interest incentives in the past based on money market mutual funds.

A preferred incentive allocation is based on "tiering", that is assigning interest rates to Clients based on their Agent-managed balance (or other Client account parameter that a Customer financial entity seeks to incent). First briefly in overview, interest allocation features of the present invention are selectively enhanced by system control of tiered interest rate allocations ("TIRA"). As noted above, Client account balances managed by the Agent are tracked on a periodic e.g. daily basis. TIRA methods tests the then current account balance for each Client having funds under Agent management. Based on the ascertained balances, the Client account is placed in one of two or more available tiers (where a method with a single tier implement a single interest rate for all accounts), with the selected tier level corresponding to the appropriate interest rate to be paid on that account balance during the deposit period. Exemplary TIRAs are found in Table 1:

TABLE I

| | |
|---|---|
| Tier I - Balance greater than $1; less than $5000 | Rate = 2% |
| Tier II - Balance greater than $5,000; less than $10,000 | Rate = 3% |
| Tier III - Balance greater than $10,000; less than $25,000 | Rate = 4% |
| Tier IV - Balance greater than $25,000; less than $50,000 | Rate = 5% |
| Tier V - Balance greater than $50,000 | Rate = 6% |

Interest rates assigned according to Table I provide incentives for Client account holders to increase their respective balance in order to achieve higher interest rates within the system constraints. Thus, TIRAs track the accounts and apply the appropriate interest rate to the current balance in accordance with the stored protocol.

One refinement of the TIRA method is to assign interest rates on, for example, the total balances held by a Client in all the Client's accounts with the Customer financial entity. Alternatively, interest rates may be tiered according to account balance and the length of time the Client has transacted business with the Customer financial entity, A further refinement of the TIRA operation includes applications to pre-defined Customer financial entity promotions. A spectrum of potential promotional tier stratagems may be stored in the Agent database, and thus are selectively available for use to assist product marketing. Exemplary promotional structures include a single "fixed" tier level (single interest rate) and "variable" tier levels, with interest rates higher for an initial period before returning to base line levels. The fixed tier structure insures that a Client account earns the same level of interest rate for the promotional period, independent of balance. For example during the promotional period an account may accrue interest at a rate of 5 percent—that is—the rate associated with the tier corresponding to a balance of $25,000 to $100,000 (in Table I), even though the account balance is only $6,000.

Variable tier levels can enhance the interest rates in some or all of the tiers during the promotional period by some factor. For example, during the promotion the enhancement may be 50 basis points ("BP") above the current tier (alternatively, a 15% interest rate bonus), thereby providing a bonus computation of this amount independent of the actual balance, but tied to the balance as done in normal non-promotional operation. Table II below exemplifies a variable promotion TIER arrangement:

TABLE II

Base Tiers

| | |
|---|---|
| Tier I - Greater than $1 - less than $5000 | Rate = 1% |
| Tier II - Greater than $5,000 - less than $10,000 | Rate = 2% |
| Tier III - Greater than $10,000 - less than $25,000 | Rate = 3% |
| Tier IV - Greater $25,000 | Rate = 4% |

| | | Bonus: | |
|---|---|---|---|
| Variable Promotion A | | BPs | Period |
| Tier I - Greater than $1 - less than $5000 | Rate = 2% | +.50 | 4/1-6/30 |
| Tier II - Greater than $5,000 - less than $10,000 | Rate = 3% | +.25 | 4/1-6/30 |
| Tier III - Greater than $10,000 - less than $25,000 | Rate = 4% | +.75 | 4/1-6/30 |
| Tier IV - Greater $25,000 | Rate = 5% | +.00 | 4/1-6/30 |

| | | Bonus: | |
|---|---|---|---|
| Variable Promotion B | | BPs | Period |
| Tier I - Greater than $1 - less than $5000 | Rate = 2% | +.50 | 5/1-7/30 |
| Tier II - Greater than $5,000 -less than $10,000 | Rate = 3% | +.50 | 5/1-7/30 |
| Tier III - Greater than $10,000 -less than $25,000 | Rate = 4% | +.00 | 5/1-7/30 |
| Tier IV - Greater $25,000 | Rate = 5% | +.00 | 5/1-7/30 |

Other parameters defining the tiers may be also adjusted by the Customer financial entities to address market conditions. Adjustment (bonus) periods may be lengthened, tiers added or subdivided, and rates may be coupled to current market indexes, such as the one-year Treasury note or Federal Funds rate. Entry of the new tier parameters into the Agent systems and methods implements the new structure.

Figure 4:
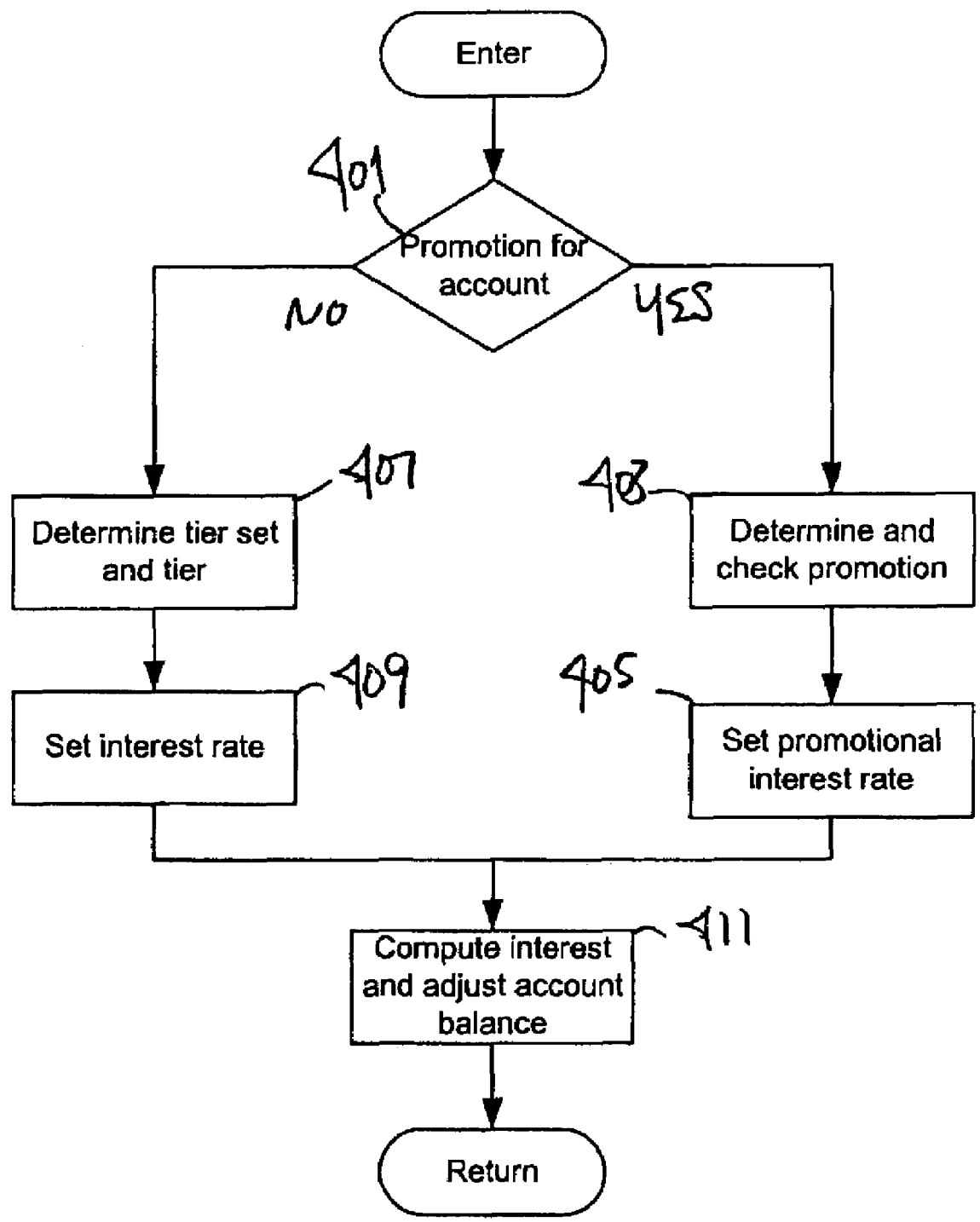
FIG. 4 illustrates an exemplary embodiment of interest-allocation processing of this invention.

FIG. 4 is an exemplary embodiment of Agent processing that is performed for each Client account that implements the preferred tiered interest rate system. As discussed above, the Agent database for each account includes one or more fields with data entries that identify, characterize, and classify each Client from the Customer financial entity's perspective. Preferably, one of these data entries is a promotional field flag indicating whether or not the current account is operating during a pending promotion. This flag is tested at step 401.

A positive response to this test leads to step 403 that determines the particular promotion (from further account record fields) and checks whether this promotion is still active (for example, has not expired). Data for the latter check is retrieved from the Customer financial entity's interest allocation parameters stored in the Agent database. If the promotion is still active, then the promotional interest rate is set 405 for this Client, again using the Customer financial entity's interest rate allocation data. If no promotion is active, the Agent then determines 407 that client tier set (set of tiers that may apply) and particular tier (within the determined tier set) from fields in the Client database record that characterize the type of Client. Next, the interest rate is set 409 using the Customer financial entity's interest rate allocation data.

Interest rate allocation for this Client concludes when the Agent uses the determined interest rate and Client's account balance to calculate 411 the amount of Client interest

5.5 Exemplary Agent Methods

On a regular and, preferably, periodic basis (for example, twice daily, daily, every other day, and so forth), the Agent performs an account-management-processing cycle during which it processes transactions for the Clients of Customer financial entities (and at the Agent itself where it or a commonly controlled entity holds Client accounts) received from various sources. For concreteness and simplicity of description (and without limitation), an Agent processing cycle is described in terms of two phases: a Client/Customer financial entity first phase, and a Supporting financial entity second phase.

Briefly, in the Client/Customer first phase, funds transfers needed between the Agent and the broker/dealers, investment advisors, savings institutions, credit unions, other Customer financial entities, and vendor financial entities that provide transaction services for the clients (referred to above also as "transaction sources") are determined, and the necessary instructions to cause these funds transfers are issued. In this phase, transaction data received for all Client accounts (and new accounts) at all the Customer financial entities (and at the Agent itself where it holds Client accounts directly) is processed in order to obtain for each Client account the net debit or the net credit in that account for that particular period, and its distribution to or from the one or more MMDAs in the Supporting financial entities (with a single MMDA held in each entity). Transaction data is received from the various transaction sources or via sweep files or both.

Also in the first phase, for each Customer the Agent sums the net debits and the net credits received from the Customer for their clients on the daily sweep transaction file to obtain the total net debit or net credit at the Customer financial entity. If the net activity is a credit, the Customer financial entity will transfer funds to the Agent; if the net activity is a debit, the Agent then issues instructions to transfer funds to the Customer financial entity. Exchange of funds with the Agent and then among the Clients of any one Customer is according to that Customer's normal processing. Finally, as the transaction files from the various Transaction sources are processed, the net credits or debits between the Agent and that Transaction source are determined, and instructions to cause this transfer are issued.

In the second phase, the Agent sums the net debits and net credits for all Clients with funds for a Supporting financial entity, and then issues instructions to transfer this amount to or from, respectively, the Supporting financial entity. In the case where the Agent manages two or more MMDAs at two or more Supporting financial entities, the Client net credits and debits are preferably allocated to the Supporting financial entities according to preferences stored in the Client records in the Agent data base. For withdrawals from a Supporting financial entity, the Agent instructs a messenger to have the funds moved from the MMDA to the associated DDA, and then withdraws the funds from the DDA. For deposits, the Agent may direct funds to either the DDA or directly to the MMDA.

This description and the following details are exemplary, and one of skill in the art will recognize that the individual steps illustrated herein may be split, combined, or otherwise rearranged, that the orders of the individual steps and of the phase may be changed, and that other alterations are possible without degrading Agent account management functions. For example, in one alternative, all phases may occur together so that after processing data for each Client account and Customer financial entity, the Supporting financial entity net debit/credit amounts are updated.

Figure 2A:
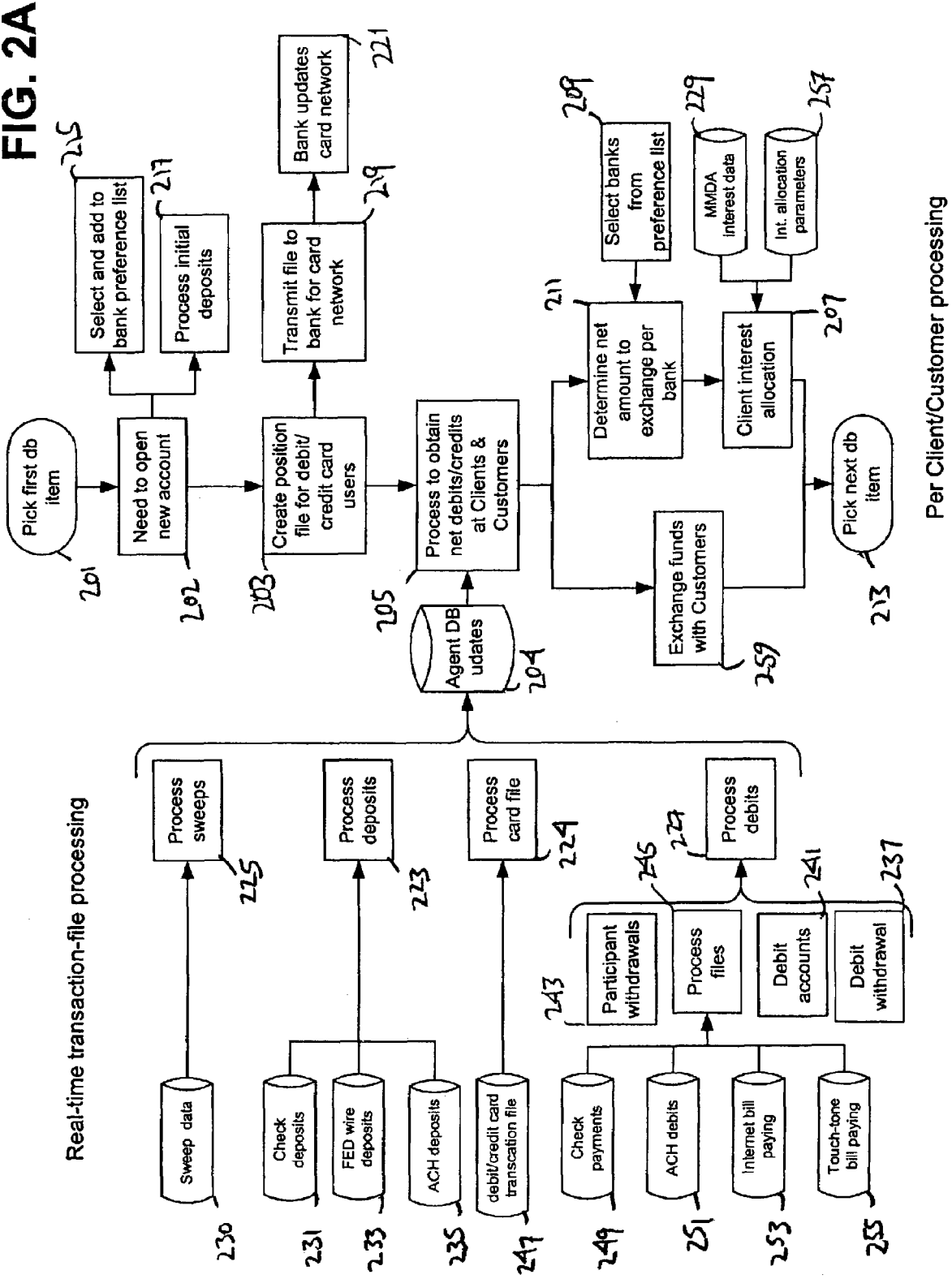
FIGS. 2A-B illustrate an exemplary embodiment of the processing operations of this invention.

These Agent processing phases are now described in more detail with reference to FIGS. 2A-B. FIG. 2A illustrates that the Client/Customer first phase includes two principal processing components or activities that are linked by updates stored in Agent database 204. Generally occurring first in time is the real-time transaction file processing (left portion of FIG. 2A) during which the daily transaction files are processed as they are received and the Agent data base is updated with the transaction results. Generally following the transaction-file processing in time is the per Client/Customer processing during which the Clients and Customer financial entities having transaction activities for the period recorded on data base 204 are individually processed to determine the resulting total net credits or net debits.

Turning to the real-time transaction-file processing, preferably, the Agent systems and methods are structured and configured to receive and process transactions from many normal financial transaction sources and vendors of financial services. Accordingly, FIG. 2A illustrates input of standard sources of credit transactions, namely check deposits 231, Federal Reserve Bank wire deposits 233, and ACH (clearing house) deposits 235. Similarly, the Agent processes debits to Client accounts from a number of sources. Direct debit withdrawals are received and processed at 237. For credit and debit cards, the issuing bank through the card association network provides 247 a transaction file which is processed at 239. Activity in debit accounts is processed at 241, and direct Client withdrawals (for example, a withdrawal made by means of the Agent) are processed at 243. Various sources provide files of debit transactions, including checks presented for payment 249, ACH (clearinghouse) debits 251, bill payments made through Internet bill payment methods 253, and automated telephone bill payment methods such as touchtone bill paying 255. In various embodiments, Agent methods and systems may receive and process transaction for other transaction sources, such as transaction made in person or received by mail and that may be manually keyed (or scanned) into the system Transaction files are processed by a hierarchy of one or more processing steps: deposit files are processed at 223; debit/credit card files are processed at 224; various debit transaction files are processed first at 245; and along with other debit transactions are processed at 227. (Note that certain sources may provide debits or credits; for example, card processing usually returns debit transactions but may return an occasional credit if a Client returns an item.) These processing steps generally perform the following similar functions. First, details of individual transaction are preferably stored on the Agent data base on a per Client and per Customer financial entity basis, and as they are being stored (or in subsequent steps), net credits and net debits for each Client and each Customer financial entity are accumulated and stored. Second, net debits or net credits are also accumulated for each of the transaction sources, and after each file is processed, instructions are generated to exchange the net funds with that source.

Concerning sweep file 230 and its processing at 225, data in the sweep files result from a Customer financial entity's processing of Client debit and Client credit transactions received against this account in most recent complete period. For example, a Customer financial entity processes all Client transactions for the previous, ex., twenty-four hour period to generate the sweep file made available in the current twenty-four hour period. For broker/dealers, for example, these transactions would typically result from Client securities purchases or sales. This file is the processed at 225 by the Agent to store the data by Client and Customer financial entity, to accumulate net debits or net credits by Client and Customer financial entity.

The Agent data base 204 is updated by this transaction processing, and the updated database is input to the following per Client/Customer processing.

In FIG. 2A, a "mainline" of per Client/Customer processing extends from 201 directly to 213. Beginning at 201 the Agent starts processing the updated items on the data base for the Clients and the Customers. If the current data item represents a new Client account, then the account is opened and initialized 202 by creating appropriate records in the Agent database. Since these records include the Supporting-financial-entity-preference list of Clients, this list is initialized 215 from either actual Client input or by the Agent in the absence of Client input, and initial deposits are then processed 217. Next, if this Client account has associated credit or debit cards, the card payment network is initialized for the next period's card transactions by creating a position file 203, as is known in the art. This position file is transmitted to the card's issuing bank 219, which then updates the card network 221 so that it may approve or deny transactions in the next processing period (for example, the next day after the current day).

Next all the data base updates with the net credits and net debits for the entity, Client or Customer financial entity, described by the current item being processed are retrieved and combined into a total net 205 for the Client or Customer financial entity. For a Customer financial entity, then Agent may then issue instructions to perform the necessary funds exchanges 259 with that Customer financial entity. Also, concurrently Agent may receive (or already has received) funds swept on that Customer financial entity's initiative.

For each Client account, the next steps of Agent processing are to allocate deposits or withdrawals to the MMDAs in various Supporting financial entities. (If there is only one Supporting financial entity, allocation processing is unnecessary). Each Client account record stores preferences for the various Supporting financial entities, either chosen by the Client or set by default. This list is retrieved 209 and the funds to be exchanged allocated 211 to the preferred Supporting financial entities.

As described, this allocation, preferably, holds funds so that the more preferred Supporting financial entities hold no less funds than the less preferred Supporting financial entities, and each Supporting financial entity holds no more than some threshold (for example, $90,000) that is less than $100,000 for each Client. The result of these last steps are the net funds to be deposited or withdrawn at each Supporting financial entity.

Interest earned by the MMDA accounts 229 is a further source of funds for Client accounts. This Interest accrues daily and is posted monthly in the MMDA at the Supporting financial entities and then in the Clients accounts. Interest allocation is performed as previously described in dependent on interest allocation parameters 257 usually supplied from time-to-time by the Customer financial entities.

Agent processing for a chosen data base item completes at step 213. Then, the Agent picks a next data base item for the next Client or Customer financial entity and begins processing again at 202 until all data base updates made by the transaction processing have been handled.

Figure 2B:
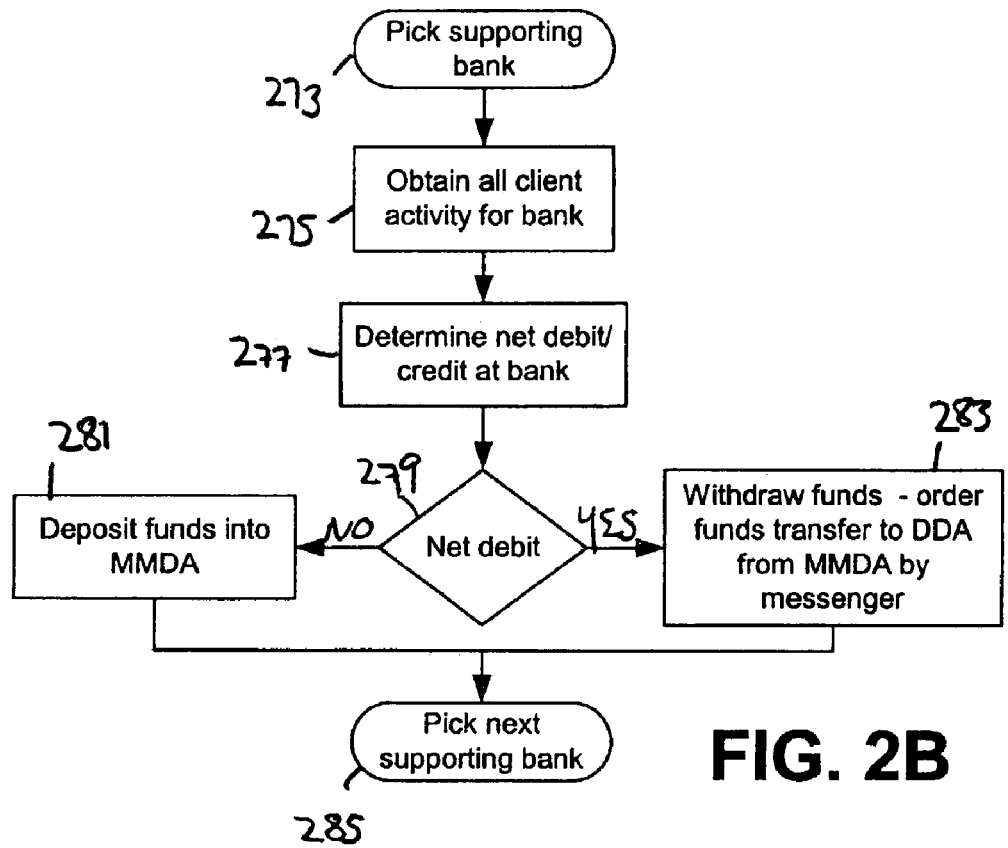

Finally, FIG. 2B illustrates processing for the Supporting financial entity phase of the Agent processing cycle. Further, since each net client debit or credit is withdrawn or deposited to one or more pooled MMDAs in the supporting financial entities, essentially the same summing or netting must be done for each Supporting financial entity as for each Client. The result may be $0, but is usually an amount of funds that must be transferred to or from the MMDAs in the Supporting financial entities to match excess Client (and Transaction source) withdrawals or deposits. Thus, for each Supporting financial entity 273, the net credits or net debits determined for that Supporting financial entity are retrieved 275 and summed 277 to obtain the net total debit or credit at that Supporting financial entity. If the total net is a credit 279, then these funds are deposited to the MMDA(s) at that Supporting financial entity in any convenient manner, optionally by means of the associated DDA(s). If the total is a debit 279, then the Agent generates instructions for a messenger to have the total transferred from the MMDA(s) to the associated DDA(s) and finally transfers the total from the DDA(s) in any manner convenient. The processing is repeated for the next Supporting bank 285. In alternative embodiments, one or more of the steps 263, 265, and 267 may be integrated with Client processing; in other embodiments these steps may be a separate process following Client processing.

The Agent transfers and receives funds for the Customer financial entities, transactions sources and for the Supporting financial entities through an administrative account. All these transfer must, as a group, sum/net to $0, because as an agent, the Agent does not accept deposits or grant credits. In essence, the Agent performs a system-wide crossing/clearing function.

5.6 Exemplary Agent Systems

Figure 3:
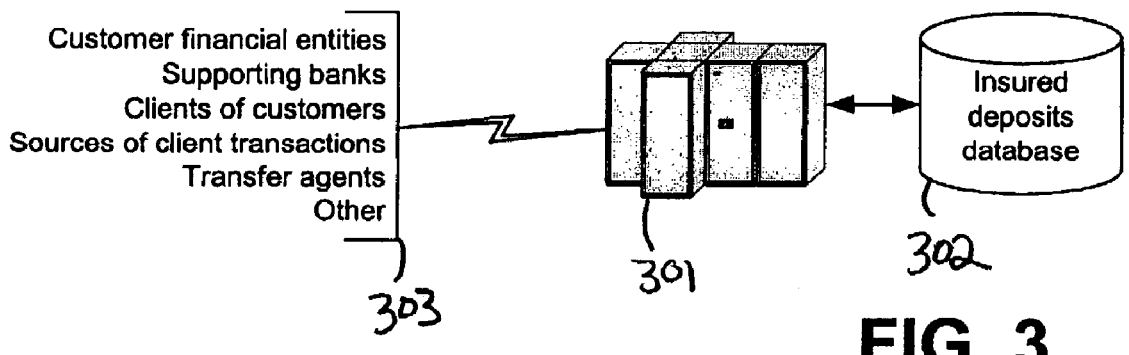
FIG. 3 illustrates an exemplary embodiment of a system of this invention.

The above account management processing, including interest allocation, is performed on Agent computer systems programmed to carry out the above methods. FIG. 3 illustrates exemplary systems are configured from standard commercial-grade components, for example, mainframe-type system 301 coupled to data storage 302 for the Agent databases, here illustrated as the "insured deposits database". A typical processor may be from IBM using an OS/390 or MVS/ESA operating system or the equivalent; a typical database system may be DB2 from IBM or the equivalent, such as products from Oracle Corp.

System 301 is also in communication 303 with Customer financial entities, Supporting financial entities, Clients (where the Agent provides statements and account information directly to Clients), sources of financial transactions (such as those illustrated in FIG. 2A), transfer agents of its Customer financial entities, and Supporting financial entities, and other data sources as necessary. Communication may be by TCP/IP, IBM SNA, or other (bisynchronous) to interface devices attached to system 301. Typically transaction and account information files are transferred over these links.

The methods of this invention may be programmed as one or more modules in convenient commercial programming languages. Either all or a portion of these modules implementing the methods of this invention may be packaged as program products on standard computer readable media (such as magnetic tapes, magnetic or optical discs, and the like).

5.7 Additional Specific Embodiments

The above-described elements of this invention relationships may be "packaged" variously to meet the needs of various Customer financial entities. In one embodiment, one Customer financial entity is linked to one Supporting financial entity, so that client accounts may be provided with up to $100,000 of FDIC insurance along with interest and unlimited withdrawals. In a second embodiment, one Customer financial entity it linked to more than one independent, Supporting financial entity so that its clients may receive more than $100,000 of FDIC insurance.

In a third embodiment, a Customer financial entity which is a bank or savings institution may wish to retain all Client funds on its own books so that they may be available for its normal financial activities. This is accommodated by having the Agent managed MMDA-DDA pair (or pairs) be held at the Customer financial entity. Otherwise, the Agent systems and methods are as described above. In this embodiment, Client insurance is limited to $100,000. In such an embodiment, the ownership interests managed by the Agent and recorded on its database may be advantageously realized as separate Client accounts at the Customer financial entity (referred to as a "return sweep account"). Then, a Client will have two accounts, one on the books of the Customer financial entity, for example, a Client demand deposit account, and a second account held on the books of the Agent, a return sweep account The Agent then manages fund exchanges between these accounts so that the funds of all Client return sweep accounts are held in the managed MMDA-DDA pairs.

Such additional embodiments preferably also include flexible allocation of interest earned on the one or more Agent-managed MMDAs according to the characteristics of Client accounts (or according to Customer indications). As described above, the Supporting financial entities credit interest earned to the MMDAs, and the Agent then allocates the credited interest among the Client ownership interests according to Client account characteristics. This allocation is preferably according to interest rates varying according to account balances as determined by a set of tiers, each tier specifying a selected interest rate for a selected range of account balances. However, interest may also be allocated according to other Client of Customer financial entity characteristics, such as the existence of an interest rate promotion.

Systems supporting these embodiments may be separate; one system supporting one embodiment for one client. Or one system may support multiple Customer financial entities using a single embodiment. Advantageously, a single networked system processes multiple Customer financial entities using multiple embodiments. In the latter case, client and Customer financial entity records will contain sufficient information to identify clients related to each Customer financial entity, and further to provide client classification information appropriate to that Customer financial entity (ex., total balance at the Customer financial entity, branch, Customer financial entity history, . . . , etc.)

Thus, it can be appreciated that by practicing the embodiment of the invention described in connection with the above figures, an individual Client is effectively provided with FDIC insurance in excess of $100,000 in an account from which unlimited withdrawals are possible. Further, the Customer financial entity holding the Client's base account is enabled to provide interest return flexibly allocated according to various Client characteristics, such as the size the Client balances.

Further embodiments will be apparent to those of skill in the art and are part of the present invention. In particular, elements of the methods and systems described above may be arranged and combined in further embodiments to achieve the objects of the invention in a manner tailored for particular Customer financial entities, or Clients, or Supporting institutions. Such additional combinations are also part of the present invention.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

The invention claimed is:

1. A method for managing funds of a plurality of respective client accounts associated with a plurality of respective clients participating in a program, comprising:
    maintaining a plurality of FDIC-insured and interest-bearing aggregated deposit accounts, each of the aggregated deposit accounts being interest-bearing, with one or more of the aggregated deposit accounts held in each different one of a plurality of financial institutions in the program;
    maintaining funds of a plurality of the clients in the plurality of aggregated deposit accounts so that each aggregated deposit account holds funds of a plurality of the clients, with each client account in a subset of the plurality of client accounts having funds in their respective client account over a predetermined amount, with each of the respective client accounts in the subset having funds deposited in a plurality of the aggregated deposit accounts;
    maintaining or having maintained or accessing by computer an electronic database, on one or more computer-readable media, comprising a respective balance of funds for each of a plurality of the respective client accounts in the subset and information on funds held by each of the plurality of clients of the subset in the plurality of aggregated deposit accounts;
    receiving electronic client transaction data describing debit and/or credit transactions made by a plurality of clients against their respective client accounts;
    updating the respective balance of funds in the database associated with each of the respective client accounts in the subset based on one or more debit and/or credit transactions made by the respective client;
    determining electronically for each of the plurality of the client accounts in the subset of client accounts a respective interest rate from among a plurality of interest rates in an interest-allocation procedure based at least in part on the updated balance of funds associated with the respective client account in the subset;
    calculating electronically a respective interest for a period to be posted to each of a plurality of respective client accounts in the subset, with the respective interest to be posted to a respective client account determined based on the respective interest rate determined for that respective client account in the subset, with the calculating being independent from the respective client account pro rata share in earnings posted to the plurality of the aggregated deposit accounts holding funds of the respective client account;
    determining interest earned during the period by each of the plurality of aggregated deposit accounts in the program; and
    posting electronically the respective interest calculated for each of the plurality of respective client accounts based on the respective interest rate determined for the respective client account.

2. The method as defined in claim 1, wherein there are a plurality of different customer financial entities, each different customer financial entity having a plurality of customer accounts associated therewith, and further comprising:
    determining the interest-allocation procedure for each of a plurality of respective client accounts based at least in part on the customer financial entity associated with the respective client account.

3. The method as defined in claim 1, wherein the respective interest rate is determined based on the respective balance of funds associated with the client in the respective client account.

4. The method as defined in claim 1, wherein the respective interest rate is determined based on respective total client funds associated with a customer financial entity.

5. The method of claim 1, wherein the interest-allocation procedure comprises assigning an interest rate from among a plurality of interest rates to a respective client account based on whether the respective balance of funds of the client is in a selected range of balances.

6. The method of claim 1, wherein the determining the interest rate step is performed independently of the determining the interest earned step.

7. The method of claim 1, wherein one or more of the clients are associated with at least one customer financial entity, wherein the steps of the method are performed by one or more computers operated on behalf of an agent entity managing the client accounts on behalf of the customer financial entity, and wherein the interest-allocation procedure is determined at least in part based on a parameter related to the customer financial entity.

8. The method of claim 7, wherein the parameter related to the customer financial entity is a total of all of the balances of the client accounts managed by the agent for the customer financial entity.

9. The method of claim 1, further comprising:
    requesting from the customer financial entity a transfer of any deficit caused by an allocation to one or more of the client accounts associated with that customer financial entity of more than the funds of those client accounts earned in the one or more aggregated deposit accounts.

10. The method of claim 1, wherein each of a plurality of the managed client accounts are associated with a different customer financial entity.

11. The method of claim 1, wherein one or more of the clients are associated with at least one customer financial entity, wherein the steps of the method are performed by an agent entity managing the client accounts on behalf of the at least one customer financial entity, and further comprising
    receiving an interest-allocation procedure from the customer financial entity.

12. The method of claim 1, wherein each of a plurality of the aggregated deposit accounts has a corresponding aggregated demand account in the financial institution holding the aggregated deposit account, and further comprising:
    generating instructions for transferring funds between the aggregated deposit account and the aggregated demand account at one or more of the financial institutions to satisfy a net of transaction credits and debits from a plurality of the clients.

13. The method of claim 1, further comprising:
    updating electronically a database with information representing
        (i) the received client transaction data,
        (ii) client-account data for a client account describing in which one or more aggregated deposit accounts the account funds are held, net client-account credits and/or debits, and interest allocated to the managed client account, and (iii) aggregated deposit accounts including net deposit-account credits and/or debits.

14. The method of claim 1, wherein one or more of the clients are associated with at least one customer financial entity, wherein one or more of the steps of the method are performed by one or more computers operated on behalf of an agent entity managing the client accounts on behalf of the at least one customer financial entity, and further comprising:

determining or having determined electronically from the electronic client transaction data a net credit or a net debit to be applied to one of the aggregated deposit accounts or distributed among a plurality of the aggregated deposit accounts;

generating instructions by the agent entity for one or more funds transfers with one or more of the aggregated deposit accounts to satisfy the determined net credit or net debit; and transferring or having transferred funds with one or more of the aggregated deposit accounts to satisfy the determined net credit or net debit.

15. A method for managing funds of a plurality of respective client accounts associated with a plurality of respective clients participating in a program, comprising:

maintaining a plurality of FDIC-insured and interest-bearing aggregated deposit accounts, each of the aggregated deposit accounts being interest-bearing, with one or more of the aggregated deposit accounts held in each different one of a plurality of financial institutions in the program;

maintaining funds of a plurality of the clients in the plurality of aggregated deposit accounts so that each aggregated deposit account holds funds of a plurality of the clients, with each client account in a subset of the plurality of client accounts having funds in their respective client account over a predetermined amount, with each of the respective client accounts in the subset having funds deposited in a plurality of the aggregated deposit accounts;

maintaining or having maintained or accessing by computer an electronic database, on one or more computer-readable media, comprising a respective balance of funds for each of a plurality of the respective client accounts in the subset and information on funds held by each of the plurality of clients of the subset in the plurality of aggregated deposit accounts;

receiving electronic client transaction data describing debit and/or credit transactions made by a plurality of clients against their respective client accounts;

determining or having determined or receiving electronically for each client account with transaction activity a net client-account credit or net client-account debit resulting from that client's one or more transactions received in the client transaction data;

updating a respective balance of funds associated with each of a plurality of the respective clients based on the respective net client-account credit or respective net client-account debit determined from the respective client's transactions;

determining electronically for each of the plurality of the client accounts in the subset of client accounts a respective interest rate from among a plurality of interest rates in an interest-allocation procedure based at least in part on the updated balance of funds associated with the respective client account in the subset;

calculating electronically a respective interest for a period to be posted to each of a plurality of respective client accounts in the subset, with the respective interest to be posted to a respective client account determined based on the respective interest rate determined for that respective client account in the subset, with the calculating being independent from the respective client account pro rata share in earnings posted to the plurality of the aggregated deposit accounts holding funds of the respective client account;

determining interest earned during the period by each of the plurality of aggregated deposit accounts in the program; and posting electronically the respective interest calculated for each of the plurality of respective client accounts based on the respective interest rate determined for the respective client account.

16. The method of claim 15, wherein one or more of the clients are associated with at least one customer financial entity, wherein one or more of the steps of the method are performed by one or more computers operated on behalf of an agent entity managing the client accounts on behalf of the at least one customer financial entity, and further comprising:

determining or having determined electronically from the electronic client transaction data a net credit or a net debit to be applied to one of the aggregated deposit accounts or distributed among a plurality of the aggregated deposit accounts;

generating instructions by the agent entity for one or more funds transfers with one or more of the aggregated deposit accounts to satisfy the determined net credit or net debit; and transferring or having transferred funds with one or more of the aggregated deposit accounts to satisfy the determined net credit or net debit.

17. A method for managing funds of a plurality of respective client accounts associated with a plurality of respective clients participating in a program, wherein there are one or more different customer financial entities, each of the one or more different customer financial entities having a plurality of the customer accounts associated therewith, comprising:

maintaining a plurality of FDIC-insured and interest-bearing aggregated deposit accounts, each of the aggregated deposit accounts having its own interest rate, with one or more of the aggregated deposit accounts held in each different one of a plurality of financial institutions in the program;

maintaining funds of a plurality of the clients in the plurality of aggregated deposit accounts so that each aggregated deposit account holds funds of a plurality of the clients, with each client account in a subset of the plurality of client accounts having funds in their respective client account over a predetermined amount, with each of the respective client accounts in the subset having funds deposited in a plurality of the aggregated deposit accounts;

maintaining or having maintained or accessing by computer an electronic database, on one or more computer-readable media comprising a balance of funds in each of a plurality of the respective client accounts in the subset and information on funds held by each of a plurality of clients in the subset in the plurality of aggregated deposit accounts;

receiving electronic client transaction data describing debit and/or credit transactions made by a plurality of clients against their respective client accounts;

determining or having determined electronically for each client account a net client-account credit or a net client-account debit resulting from that client's one or more transactions received in the client transaction data;

generating a respective updated balance of funds associated with each of the respective client accounts in the subset based on the net client-account credit or net client-account debit determined from the respective client's one or more transactions;

determining or having determined electronically from the electronic client transaction data or the respective net client-account credits or net client-account debits a net credit or a net debit to be applied to one of the aggregated deposit accounts or distributed among a plurality of the aggregated deposit accounts;

generating instructions for transferring funds with one or more of the aggregated deposit accounts at the one or more financial institutions to satisfy the net credit or debit for the plurality of client accounts;

determining an interest-allocation procedure for each of a plurality of respective client accounts based at least in part on the customer financial entity associated with the respective client account;

determining electronically for each of the plurality of the respective client accounts in the subset of client accounts a respective interest rate from among a plurality of interest rates in the determined interest-allocation procedure based on the updated balance of funds associated with the respective client;

calculating a respective interest for a period to be posted to each of a plurality of the respective client accounts in the subset, with the respective interest to be posted to the respective client account determined based on the respective interest rate determined for that respective client account in the subset, with the calculating being independent from the respective client account pro rata share of earnings posted to the plurality of the aggregated deposit accounts holding funds of the respective client account;

determining interest earned during the period by each of the plurality of aggregated deposit accounts in the program; and posting electronically the respective interest calculated for each of the plurality of respective client accounts based on the respective interest rate determined for the respective client account.

18. A method for managing funds of a plurality of respective client accounts associated with a plurality of respective clients participating in a program, wherein there are a plurality of different customer financial entities, each different customer financial entities having a plurality of the customer accounts associated therewith, comprising:

maintaining a plurality of FDIC-insured and interest-bearing aggregated deposit accounts, each of the aggregated deposit accounts being interest-bearing, with one or more of the aggregated deposit accounts held in each different one of a plurality of financial institutions in the program;

maintaining funds of a plurality of the clients in the plurality of aggregated deposit accounts so that each aggregated deposit account holds funds of a plurality of the clients, with each client account in a subset of the plurality of client accounts having funds in their respective client account over a predetermined amount, with each of the respective client accounts in the subset having funds deposited in a plurality of the aggregated deposit accounts;

maintaining or having maintained or accessing by computer an electronic database, on one or more computer-readable media, comprising a balance of funds in each of a plurality of the respective client accounts in the subset and information on funds held by each of a plurality of clients in the subset in the plurality of aggregated deposit accounts;

receiving electronic client transaction data describing debit and/or credit transactions made by a plurality of clients against their respective client accounts;

determining or having determined electronically for each client account a net client-account credit or a net client-account debit resulting from that client's one or more transactions received in the client transaction data;

generating a respective updated balance of funds associated with the respective client accounts in the subset based on the net client-account credit or net client-account debit determined from the respective client's transactions;

determining or having determined electronically from the electronic client transaction data or the respective net client-account credits or net client-account debits a net credit or a net debit to be applied to one of the aggregated deposit accounts or distributed among a plurality of the aggregated deposit accounts;

generating instructions for transferring funds with one or more of the aggregated deposit accounts at the one or more financial institutions to satisfy the net credit or debit for the plurality of client accounts;

transferring or having transferred funds with one or more of the aggregated deposit accounts to satisfy the net credit or net debit for the plurality of client accounts;

determining an interest-allocation procedure for each of a plurality of respective client accounts based at least in part on the customer financial entity associated with the respective client account;

determining electronically for each of the plurality of the client accounts in the subset of client accounts a respective interest rate from among a plurality of interest rates in the determined interest-allocation procedure based on the updated balance of funds associated with the respective client;

calculating a respective interest for a period to be posted to each of a plurality of the respective client accounts in the subset, with the respective interest to be posted to the respective client account determined based on the respective interest rate determined for that respective client account in the subset, with the calculating being independent from the respective client account pro rata share of earnings posted to the plurality of the aggregated deposit accounts holding funds of the respective client account;

determining interest earned during the period by each of the plurality of aggregated deposit accounts in the program; and posting electronically the respective interest calculated for each of the plurality of respective client accounts based on the respective interest rate determined for the respective client account.

\* \* \* \* \*

UNITED STATES PATENT AND TRADEMARK OFFICE
CERTIFICATE OF CORRECTION

PATENT NO. : 7,509,286 B1
APPLICATION NO. : 10/411650
DATED : March 24, 2009
INVENTOR(S) : Bruce Bent and Bruce Bent, II It is certified that error appears in the above-identified patent and that said Letters Patent is hereby corrected as shown below:

ON THE TITLE PAGE:

(60) Provisional Application No.: Delete "60/372,374, filed on April 12, 2002" and replace it with --60/372,347, filed April 12, 2002--.

(57) ABSTRACT: Line 8, delete "of" and replace it with --or--.

IN THE SPECIFICATION:

Col. 1, line 18, delete "60/372,374" and replace it with --60/372,347--.

Col. 7, line 18, delete "earn" and replace it with --earning--.

IN THE CLAIMS:

Claim 10, Col. 28, line 41, delete "managed".

Claim 17, Col. 30, line 56, after "media" insert --,--.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,509,286 B1 |
| APPLICATION NO. | : 10/411650 |
| DATED | : March 24, 2009 |
| INVENTOR(S) | : Bruce Bent et al. |

It is certified that error appears in the above-identified patent and that said Letters Patent is hereby corrected as shown below:

IN THE SPECIFICATION

Column 1, after line 22 (after the heading "2.1 Field of Invention"), please delete the following:

"It would be desirable if depositors and investors could obtain FDIC insured, interest-bearing accounts with interest rates that can be flexibly assigned, with an unlimited number of fund transfers per month, and with insurance that may exceed $100,000. However, account offerings in the United States ("US") are limited by statutes generally codified as Title 12 of the United States Code ("U.S.C.") (Banks and Banking). These statutes and accompanying regulatory scheme limit investors and depositors seeking investments and deposits having a lower risk profile to a rather limited selection of choices, all of which suffer inhibiting constraints."

Column 1, after line 22 (after the heading "2.1 Field of the Invention"), please add the following:

--The invention relates generally to computerized account management techniques and, more specifically, to techniques by which financial entities may offer accounts allowing unlimited withdrawals while the deposited funds earn interest at rates that can be flexibly assigned and are covered by deposit insurance.--

Column 1, after line 34 (after the heading "2.2 Background Art"), please add the following:

--It would be desirable if depositors and investors could obtain FDIC insured, interest-bearing accounts with interest rates that can be flexibly assigned, with an unlimited number of fund transfers per month, and with insurance that may exceed $100,000. However, account offerings in the United States ("US") are limited by statutes generally codified as Title 12 of the United States Code ("U.S.C.") (Banks and Banking). These statutes and accompanying regulatory scheme limit investors and Signed and Sealed this Twenty-fifth Day of May, 2010

David J. Kappos
*Director of the United States Patent and Trademark Office* depositors seeking investments and deposits having a lower risk profile to a rather limited selection of choices, all of which suffer inhibiting constraints.--

--Financial entities are prevented from paying interest on certain types of deposit accounts, especially "demand deposit accounts" that permit unlimited withdrawals of deposited funds, by relevant statutes and regulations, namely Title 12 U.S.C. Chapter 3 (Federal Reserve System); Title 12 Code of Federal Regulations ("C.F.R.") Chapter II Part 204 (12 C.F.R. §§ 204.1-204.136) (Federal Reserve Board ("FRB") Regulation D); and Title 12 C.F.R. Chapter II Part 217 (12 C.F.R. §§ 217.1-217.101) (FRB Regulation Q).--

Column 1, after line 48, please add the following:

--Second, deposit insurance provided by the Federal Deposit Insurance Corporation ("FDIC") is limited in various ways. The FDIC is a federal governmental entity created under Title 12 U.S.C. Chapter 3 (the Federal Deposit Insurance Corporation) that provides insurance for deposits in most banks and savings institutions in the United States. Bank deposits are insured by the FDIC's Bank Insurance Fund ("BIF") and savings institutions' deposits are insured by the FDIC's Savings Association Insurance Fund ("SAIF").--

Column 1, after line 58, please delete the following:

"One or more of these objects are satisfied by systems and methods structured according to a novel and creative combination of certain of financial-entity and bank regulations first noticed and assembled by the inventors. First, although accounts that require withdrawal notice are not demand accounts and therefore may earn interest, certain accounts not requiring withdrawal notice may still be deemed "savings accounts" and capable of earning interest. For example, an account that does not require withdrawal notice (but may so require at any time) is nevertheless a savings account if no more than six transfers and withdrawals are made monthly. In particular, 12 C.F.R. § 204.2(d)(1) (underlining added) states:"

"Therefore, the inventors have conceived and implemented arrangements whereby a single corporation, partnership, or other legal person (generally, "entity") acts as an agent of numerous individuals or other ownership interests (for example, joint ownership, ownership in trust (such as individual retirement accounts, and other legally established savings mechanisms), and so forth) to manage the funds of each ownership interest in the aggregate MMDAs in one or more Supporting financial entities so that each ownership interest's funds are earning interest while remaining FDIC insured with insurance up to $100,000 per each participating Supporting banking financial entity.

Further, each Supporting financial entity, such as a bank or a saving institution, holds a single MMDA that is paired with a single corresponding DDA in the same name so that each ownership interest's use of managed funds is not limited."

"To accomplish these and other objectives, this invention provides systems and methods for managing a plurality of Clients of one or more Customer financial entities by administering at one or more Supporting financial entities, such as banking or savings institutions, an FDIC-insured MMDA (money market deposit account) maintained at each participating Supporting financial entity in which are held some or all of the funds in the managed Client accounts, and for managing an Agent database recording the financial information describing the managed Client balances, Client information for each Client's account, Customer information for each Customer financial entity, financial information describing each aggregate MMDA held at a Supporting financial entity, and information for each Supporting financial entity. Where Client funds are held across more than one MMDA, the funds may be insured to more than $100,000. For example, if they are held in two (or three, or four) MMDAs (each MMDA held in a different Supporting financial entity), then insurance may be $200,000 (or $300,000, or $400,000)."

"In certain embodiments, where the Agent has a single MMDA-DDA pair in which all Agent-managed Client funds are held, Client liability insurance is limited to $100,000. In other embodiments, where it is preferable to provide Clients with more than $100,000 of insurance, the Agent has two or more MMDA-DDA pairs, each pair in a different Supporting financial entity, and it manages Client funds so that each Client's ownership interest at any one Supporting financial entity never exceeds $100,000. For example, when a Client's balance exceeds $90,000 (or some other operational threshold not greater than $100,000) in the aggregate MMDA at a particular Supporting financial entity, excess funds are automatically moved to a MMDA at a second Supporting financial entity. Although, Client funds may be from time-to-time be deposited at several Supporting financial entity, the accounting for these funds is preferably consolidated so that the multiple MMDAs are transparent to the investor. All Client funds exchanges and transactions may then post to a single Client account on the Agent database although the balances in this account may spread across multiple MMDAs held at multiple Supporting financial entities (represented as sub-accounts of the single Client account)."

"In a preferred embodiment, the functional relationship determining interest rate (for a particular Customer financial entity) is implemented largely with one or more interest rate tables. An interest rate table is known herein as a "tier set," which has one or more rows, known as "tiers."

Each tier, or row, specifies at least a range for a selected, primary account characteristic along with the interest rate to be assigned to accounts when their selected characteristic is in the specified range. For example, where the selected characteristic is account balance, a tier set preferably includes tiers such that whatever its balance an account is assigned some interest rate (almost always, the higher the balance, the higher the assigned interest rate). One of skill in the art will appreciate that a selected functional relationship of account characteristics to interest rate may be implemented by a many tier sets. Because the relation between interest rate determination and tier sets is not unique, what is fundamental is the functional relation determining interest rate; a particular tier set is simply one expression of the fundamental functional relation specified by the Customer financial entity."

"In one aspect of this embodiment, the Agent provides interest rates that vary as the amount of managed balances vary, generally the higher the balance, the higher the interest rate. The Agent database stores sets of tables referred to as "tier sets," each table returns interest rates (or a relative interest rate) as a function of the managed balance in a Client's account. During the process of interest allocation for a Client account, the Agent retrieves the tier set for a particular Client account, and applies the correct tier to the managed account balance to return an interest rate according to which the interest income is credited to the Client's account balance. The tier set for a particular Client account may be chosen according to information and flags stored as part of the Client information on the Agent database. The tier sets, tiers, and information for selecting tier sets and tiers may be provided by the Customer financial entity."

"In a concrete preferred embodiment, a Customer financial entity, such as a broker/dealer, an investment advisor, a credit union, or other financial entity, may wish to pay higher interest rates to accounts with larger balances because they are usually more profitable than accounts with smaller balances, and may also wish to run interest rate promotions from time-to-time. Accordingly, this Customer financial entity may specify a tier set with a base tier set applicable to all its Clients in the absence of further indication in the account. Typically, a base tier set leads to the same interest rate for all account balances (for example, by having a single tier). The tier set would also have a standard tier set (or more than one) leading to increasing interest rates with increasing balances. Finally, there would be one or more promotional tier sets that determines the promotional interest rates. The promotion tier set may also include time information. For example, all Client accounts opened from April $1^{st}$ through June $30^{th}$ earn 5%, but after June $30^{th}$ all accounts in the tier group will default to a tier set that determines interest rates based on the balance in the account. Alternatively, the promotional tier set may specify that each account has an individual promotional period. For example, an account may earn a promotional rate for the first 60 days after it is opened at the Customer financial entity. On the 61$^{st}$ day, the account will default to a standard."

"As illustrated, the Agent is generally central in these information and funds exchanges, receiving and processing transaction data and then causing necessary funds transfers."

"The Agent database also preferably additionally stores records describing and representing the Customer financial entities, such as records 15 and 16. These stored records represent at least Customer financial entity identification and such other information as the Agent needs to manage the Customer financial entity's Clients, including importantly parameters provided by the Customer financial entity to guide interest allocation. Thus the records describing Customer financial entity 1, records 15, include its interest allocation parameters and instructions 20, and those for Customer financial entity 2, records 16, include its interest allocation instructions 23. Where interest is allocated according to tier sets and tiers, the interest allocation records described the Customer-financial-entity-defined balance balance-tiers and associated interest rate, both of which may be changed by the Customer financial entity from time-to-time. Although FIG. 1A illustrates all the records for the individual Customer financial entities being grouped together, actual implementation of the Agent database may organize and physically store records in any manner convenient."

"3.  SUMMARY OF THE INVENTION 3.1  Objects of the Invention"

"To meet statutory and regulatory requirements, the Agent provides Clients through the Customer financial entities with information describing their accounts and their transactions held on the Agent's database. The Customer financial entity may decide to incorporate this account information into their statements to the client, or to have the Agent produce a separate statement. Thus, all activity sweeps, checks written debit/credit card transactions, and so forth appear in the account in the Clients' accounts as well as in the sub-accounts for the Clients when more than one supporting financial entity is used to provide FDIC insurance over $100,000. Although detail of these sub-accounts may or may not be reported to the client (at the option of the Customer financial entity), the Agent preferably provides the Clients at least with the balances held in each pooled MMDA at each Supporting financial entity."

"Next, Client funds for which the Agent is responsible are managed at one or more Supporting banks (financial entities) 25, 26, and 27 in a manner to both qualify for FDIC insurance, limited to $100,000 per individual beneficial interest per Supporting financial entity, to earn interest, and to permit unlimited withdrawals. To satisfy regulatory requirements, each Supporting financial entity holds a pair of accounts, one account being an interest bearing money market deposit account (MMDA) in which all Client funds are deposited, and the other account being a demand deposit account (DDA) registered in the identical name as the first account (ex., "Administrator as agent for Clients"). For funds transfers from Supporting financial entities, the Agent, first, provides instructions to a messenger who personally requests the withdrawal from the MMDA to the associated DDA in a Supporting financial entity. Funds may then be wired from the DDA out of the Supporting financial entity by the Agent to cover client withdrawals from various sources. Transfer into the pooled MMDA may be direct or through the pooled DDA as dictated by operational convenience. As illustrated, Supporting bank 25 has linked MMDA 28 and DDA 29 between which the Agent exchanges funds 38'. Similarly, the Agent exchanges funds 38" between MMDA 30 and DDA 31 in Supporting bank 26."

"Another important source of transactions are sweep transactions received in sweep file forwarded from the Customer financial entities. Where Client transactions made at a Customer financial entity in a certain period generate net credits, the Customer financial entity may sweep excess Client funds to the Agent. In case of the converse, where Client transactions generate net debits at the Customer financial entity, this entity may request funds from the Agent to cover such debits. Alternately, funds may be swept to or from the Agent when funds in Client accounts at Customer financial entities exceed or fall below, respectively, a desired or target minimum balance, which may be the same for all the Customer financial entity's clients, or may vary among the Clients. Sweep files may optionally also provide summary or detailed information on the subject Client transactions. The Agent also processes sweep files in real-time to update the net credits and debits and for each Customer financial entity (for each Client if the sweep file contains the necessary information)."

"Concerning sweep file 230 and its processing at 225, data in the sweep files result from a Customer financial entity's processing of Client debit and Client credit transactions received against this account in most recent complete period. For example, a Customer financial entity processes all Client transactions for the previous, ex., twenty-four hour period to generate the sweep file made available in the current twenty-four hour period. For broker/dealers, for example, these transactions would typically result from Client securities purchases or sales. This file is processed at 225 by the Agent to store the data by Client and Customer financial entity, to accumulate net debits or net credits by Client and Customer financial entity."

"Interest earned by the MMDA accounts 229 is a further source of funds for Client accounts. This Interest accrues daily and is posted monthly in the MMDA at the Supporting financial entities and then in the Clients accounts. Interest allocation is performed as previously described in dependence on interest allocation parameters 257 usually supplied from time-to-time by the Customer financial entities."

"The above account management processing, including interest allocation, is performed on Agent computer systems programmed to carry out the above methods. FIG. 3 illustrates exemplary systems that are configured from standard commercial-grade components, for example, mainframe-type system 301 coupled to data storage 302 for the Agent databases, here illustrated as the "insured deposits database." A typical processor may be from IBM using an OS/390 or MVS/ESA operating system or the equivalent; a typical database system may be DB2 from IBM or the equivalent, such as products from Oracle Corp."

"The above-described elements of this invention relationships may be "packaged" variously to meet the needs of various Customer financial entities. In one embodiment, one Customer financial entity is linked to one Supporting financial entity, so that client accounts may be provided with up to $100,000 of FDIC insurance along with interest and unlimited withdrawals. In a second embodiment, one Customer financial entity is linked to more than one independent, Supporting financial entity so that its clients may receive more than $100,000 of FDIC insurance."

"In a third embodiment, a Customer financial entity which is a bank or savings institution may wish to retain all Client funds on its own books so that they may be available for its normal financial activities. This is accommodated by having the Agent managed MMDA-DDA pair (or pairs) be held at the Customer financial entity. Otherwise, the Agent systems and methods are as described above. In this embodiment, Client insurance is limited to $100,000. In such an embodiment, the ownership interests managed by the Agent and recorded on its database may be advantageously realized as separate Client accounts at the Customer financial entity (referred to as a "return sweep account"). Then, a Client will have two accounts, one on the books of the Customer financial entity, for example, a Client demand deposit account, and a second account held on the books of the Agent, a return sweep account. The Agent then manages fund exchanges between these accounts so that the funds of all Client return sweep accounts are held in the managed MMDA-DDA pairs."

Column 1, after line 58, please add the following:

--Additionally, such insured, interest-bearing, demand accounts with flexibly-assigned interest rates would be desirable not only for depositors and investors but also for financial entities such as broker/dealers, savings institutions, credit unions, and the like seeking their deposits. In more detail, broker/dealers and some other financial institutions have been able to pay interest on their deposits. However, these deposits are not backed by insurance comparable to that provided by the FDIC (a portion of cash in broker/dealer accounts may be insured by SPIC). Also, their interest-rate flexibility is strictly limited by the securities statutes. For example, under the Regulated Investment Company Act of 1940, money market mutual funds, which are often used to provide income on deposits, must pay the same rate of return to each account owner, thereby limiting an institution's ability to respond to the varying profitability of different classes of accounts.--

--Banks and other savings institutions have developed several approaches, which include money fund sweeps and re-purchase agreement ("repo") sweeps, in an effort to compete with those financial institutions, principally broker/dealers, who are able to offer interest on cash balances for their commercial customers. However, these approaches are disadvantageous in that they involve a removal of commercial customer deposits from the bank's balance sheets. This disadvantage is especially burdensome for smaller, regional or local banks.--

--Further, banking institutions have been able to take advantage of the interest-rate flexibility permitted by statute and regulation to address a problem of bank management that has grown in importance, namely the differential profitability of different classes of accounts. The economics of bank management are such that costs for an account are relatively fixed, and are largely independent of account balances. However, income from a given account is generally a function of the differential in the interest paid and that earned by the bank in subsequent re-investments of account funds. In particular, accounts with significant account balances are substantially more profitable, in comparison with accounts that have lower balances.--

--For example, prior art certificates of deposit or CDs are issued by banks to provide an insured interest bearing investment that preserves the invested capital. Typically, CDs are a commitment by the depositor for a select period of time, e.g., 6 months, or 2 years, etc. where the deposits remain without any access by the investor for alternate uses. To create incentives for investing larger amounts of capital, many banks use their interest-rate flexibility to vary the interest rate paid on CDs in two dimensions. Along a first dimension, CDs pay a rate that will vary depending how long the funds are committed. Longer commitment periods are rewarded with a corresponding higher rate of return. Along a second dimension, many banks permit investors to gain a greater interest rate when the investor commits an increasing amount to the CD. These variations are very attractive to investors, but are linked to the severe handicap suffered by all CDs, in that any alternate use of the funds or penalty-free early withdrawal is essentially foreclosed.--

--Therefore, what is needed are systems and methods for providing insured, interest-bearing accounts at broker/dealers, savings institutions, credit unions, and the like with interest rates that can be flexibly assigned with an unlimited number of fund transfers per month, and with insurance that may exceed $100,000. It would be especially advantageous if these systems could be readily integrated into the existing infrastructure of a broker/dealer, savings institution, or credit union and in a manner that would minimally disrupt existing relationships between clients and their broker/dealers, savings institutions, credit unions and other financial entities.--

--Citation or identification of any reference in this Section or any section of this application shall not be construed that such reference is available as prior art to the present invention.--

--3. SUMMARY OF THE INVENTION--

--3.1 OBJECTS OF THE INVENTION--

--Therefore, in view of the prior art, the objects of this invention include the following. One object is to provide new systems and methods that, in cooperation with the existing systems and methods of a broker/dealer, savings institution, credit union, or other financial entities generally ("a Customer financial entity" or a "Customer"), manage a plurality of accounts for multiple depositors or investors of the Customer institution ("Clients of the Customer financial entity" or "Clients") so that the funds in the accounts return flexibly-allocated interest income, are properly insured, and are available for unlimited (at least more than six) transfers per month.--

--It is another object that the provided systems and methods permit the interest-income allocation to be based on fixed or variable rate structures, to provide for Customer financial entity account marketing promotions.--

--It is another object that the provided systems and methods allow Clients of Customer financial entities to deposit funds by means of any of various known methods, and to make payments from the account by means of any of various known methods and instruments.--

--It is another object that the provided systems and methods permit the interest-income allocation to be based on plural discrete tiers or on a function for setting the interest rate levels seen by clients in accordance with account parameters such as current cash balance, nature of the Client-Customer-financial entity relationship, and so forth.--

--It is another object that the provided systems and methods have minimal impact on presently-existing, Customer-financial-entity-to-Client relationships, and are readily merged into the existing systems and methods of the Customer financial entity.--

--It is another object that the provided systems and methods permit a Customer financial entity, if desired, to retain deposited funds on its books so that these funds can be used for normal Customer-entity activities, such as a source for loans.--

--It is another object that the provided systems and methods take advantage of FDIC deposit insurance in a manner that, from the viewpoint of the Clients of Customer financial entities, removes the $100,000 FDIC insurance limitation so that Client accounts may contain in excess of $100,000 and continue to be insured by the FDIC.--

--It is another object that the provided systems and methods permit a Customer financial entity, if desired, to structure account profitability through flexible allocation of interest income, the parameters of which may be flexibly controlled by the Customer.--

Column 6, line 6, delete "These prior-art problems" and replace with --One or more of these objects--.

Column 7, line 17, delete "are".

Column 8, line 33, delete "of" and replace with --or--.

Column 9, line 48, delete "this" and replace with --these--.

Column 11, line 45, delete ""tier set"," and replace with --"tier set,"--.

Column 11, line 46, delete ""tiers"." and replace with --"tiers."--.

Column 11, line 49, insert after "characteristic" the word --is--.

Column 11, line 65, delete ""tier sets"," and replace with --"tier sets,"--.

Column 12, line 7, delete "an" and replace with --and--.

Column 12, line 51, delete "Client" and replace with --Clients--.

Column 12, line 61, after "default to" delete "the".

Column 14, line 19, please make new paragraph beginning at "FIGS. 2A-B".

Column 16, line 19, delete "in" and replace with --is--.

Column 16, line 44, delete "additional" and replace with --additionally--.

Column 16, line 45, after "describing" insert --and--.

Column 17, line 3, after "written" insert --,--.

Column 17, line 6, delete "on" and replace with --one--.

Column 17, line 30, delete "of" and replace with --or--.

Column 18, line 25, after "also" insert --provide--.

Column 21, line 60, after "interest" insert --.--.

Column 23, line 61, after "is" delete "the".

Column 24, line 48, delete "dependent" and replace with --dependence--.

Column 25, line 27, after "systems" insert --that--.

Column 25, line 30, delete "database"." and replace with --database."--.

Column 25, line 62, delete "it" and replace with --is--.

Column 26, line 13, after "account" insert --.--.